United States Patent
Ikeda et al.

(10) Patent No.: US 6,782,191 B1
(45) Date of Patent: Aug. 24, 2004

(54) ADDITIONAL INFORMATION SUPERPOSING METHOD, INFORMATION SIGNAL COPY CONTROL METHOD, INFORMATION SIGNAL OUTPUT DEVICE AND INFORMATION SIGNAL RECORDING DEVICE

(75) Inventors: Nozomu Ikeda, Tokyo (JP); Akira Ogino, Tokyo (JP); Hisayoshi Moriwaki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/442,515

(22) Filed: Nov. 18, 1999

(30) Foreign Application Priority Data

Nov. 20, 1998 (JP) .......................................... 10-330939

(51) Int. Cl.$^7$ .......................... H04N 9/00; H04N 7/167; H04N 5/91
(52) U.S. Cl. .............................. 386/94; 386/1; 380/201
(58) Field of Search ........................ 386/1, 94; 360/60; 380/201, 203; 713/176

(56) References Cited

U.S. PATENT DOCUMENTS

| | | | | |
|---|---|---|---|---|
| 5,778,064 A | * | 7/1998 | Kori et al. ................... | 380/203 |
| 5,907,655 A | * | 5/1999 | Oguro .......................... | 386/94 |
| 6,035,094 A | * | 3/2000 | Kori ............................. | 386/94 |
| 6,044,157 A | * | 3/2000 | Uesaka et al. .............. | 380/201 |
| 6,175,639 B1 | * | 1/2001 | Satoh et al. ................. | 382/100 |
| 6,301,663 B1 | * | 10/2001 | Kato et al. ................... | 713/176 |
| 6,374,036 B1 | * | 4/2002 | Ryan et al. ................... | 386/94 |
| 6,434,322 B1 | * | 8/2002 | Kimura et al. ................ | 386/94 |

* cited by examiner

Primary Examiner—Thai Tran
Assistant Examiner—Polin Chieu
(74) Attorney, Agent, or Firm—Frommer Lawrence & Haug LLP; William S. Frommer

(57) ABSTRACT

An image signal to be outputted is divided into two areas or a first area and a second area. In an electronic watermarking information forming section (WM forming section), a spectrum spread signal (electronic watermarking information) is formed as the first additional information so as to be superposed on the first area of the image signal. The spectrum spread signal is superposed on the first area of the image signal by an electronic watermarking information superposing section (WM superposing section). Moreover, in the case where the image signal is recorded on a recording medium, for example, the second additional information is newly superposed on the second area of the image signal. Thus, deterioration of the information signal is suppressed at minimum, and first and second additional information are superposed on the information signal to be capable of transmitting the information signal.

25 Claims, 15 Drawing Sheets

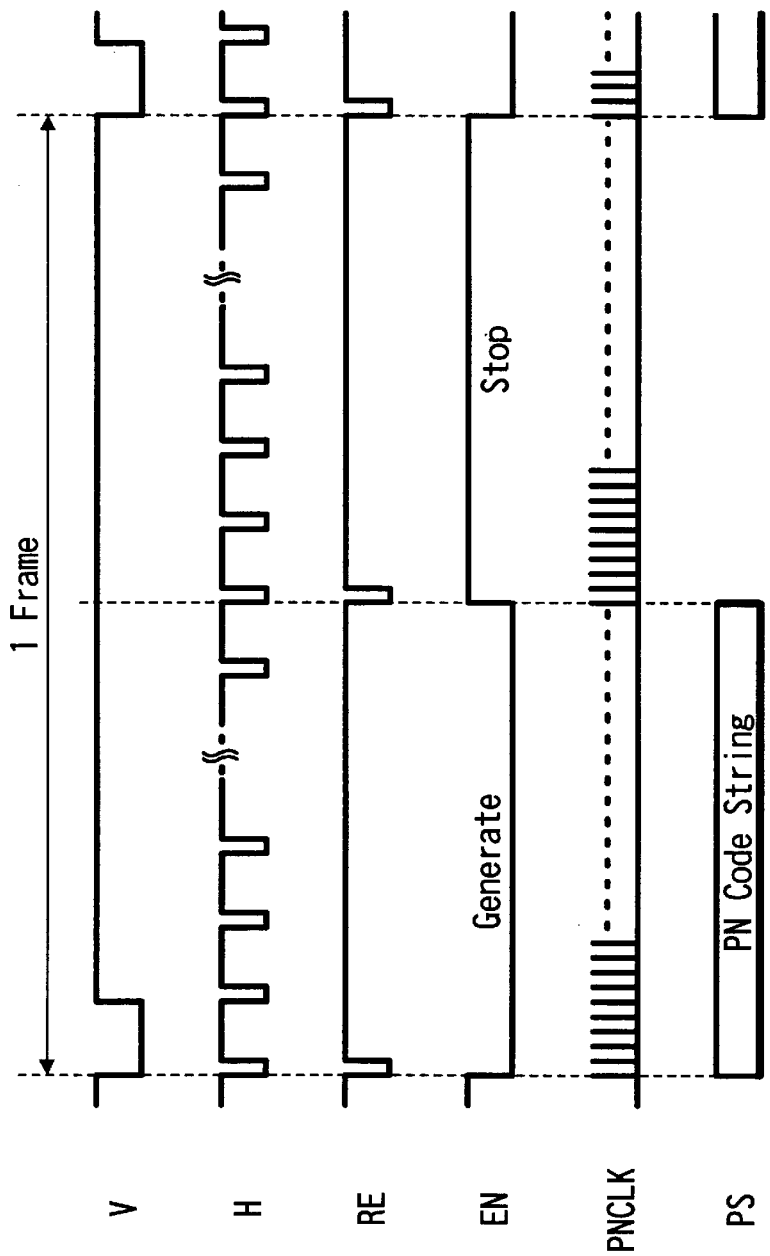

Copy Control Information Spectrum
Before Spectrum Spread

Copy Control Information Spectrum
After Spectrum Spread

Information Signal Spectrum on Which
SS Copy Control Information was
Superposed

Signal Spectrum After Spectrum
Inverse Spread

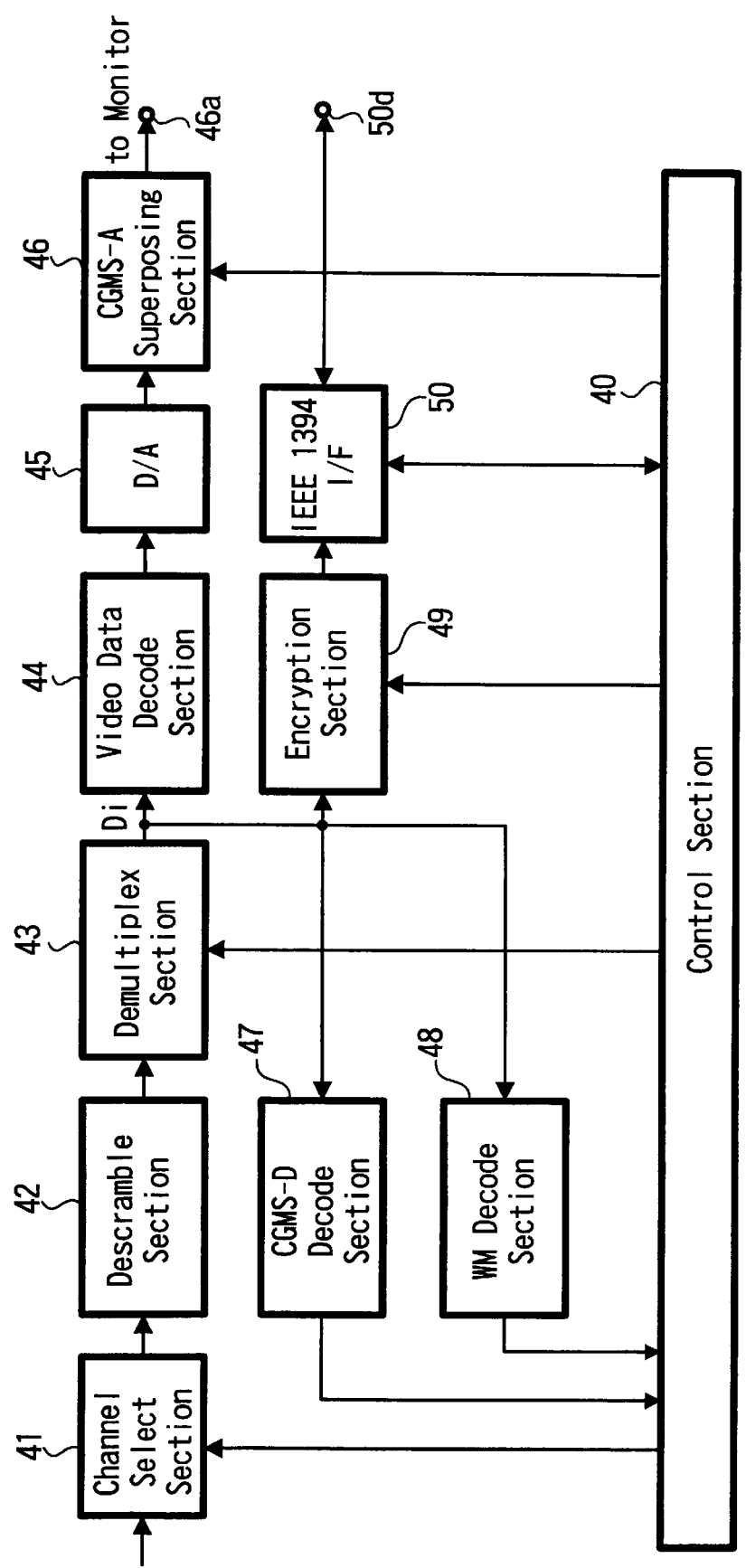

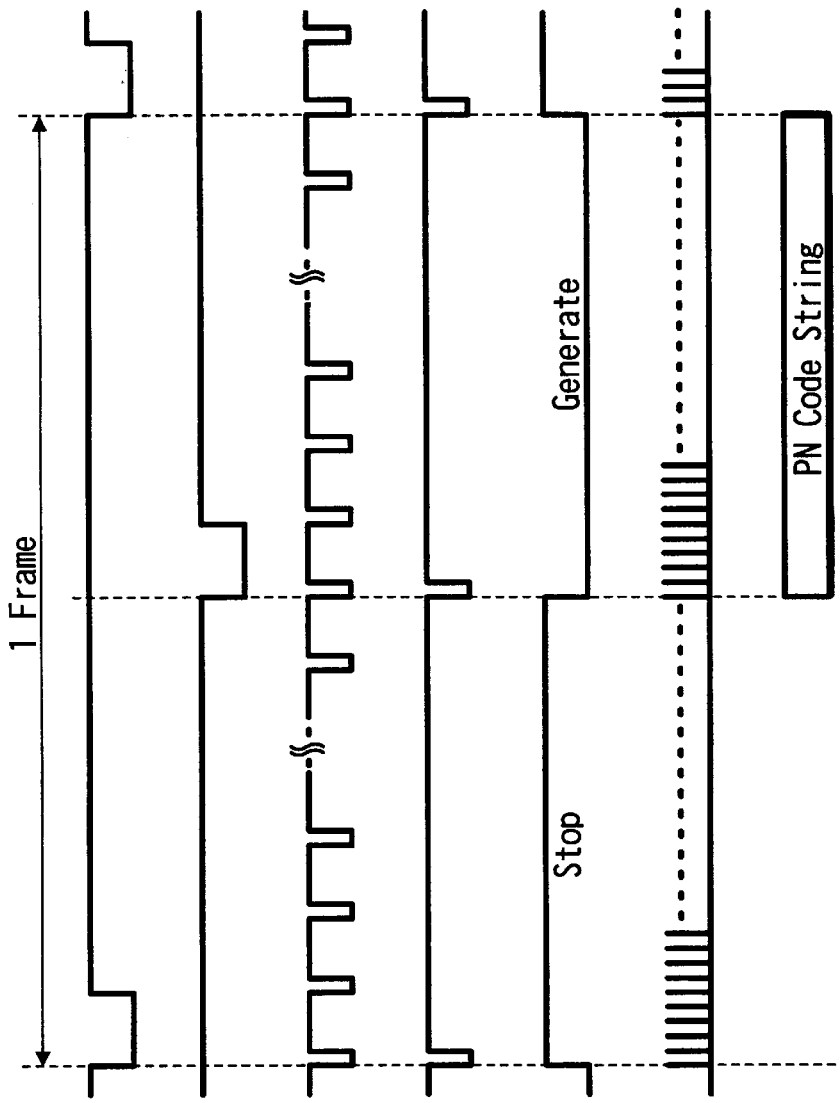

ADDITIONAL INFORMATION SUPERPOSING METHOD, INFORMATION SIGNAL COPY CONTROL METHOD, INFORMATION SIGNAL OUTPUT DEVICE AND INFORMATION SIGNAL RECORDING DEVICE

BACKGROUND OF THE INVENTION

1. Field of the Invention

The present invention relates to an additional information superposing method of superposing additional information on an information signal which is provided with it being recorded on a recording medium such as a DVD (Digital Video Disc) and so on or an information signal transmitted through a transmission medium such as internet and broadcasting media and so on, an information signal copy control method of controlling a copy generation of an information signal by using additional information added to the information signal, an information signal output device and an information signal recording device.

2. Description of the Related Art

In recent years, with the spread of digital contents such as internet and digital video disk or the like, there arises a problem of piracy that the digital contents are copied illegally. Therefore, in order to cope with this problem, it is considered that information for controlling a copy is added to the digital contents and the illegal copy is prevented by using the additional information.

As for the control to prevent the copy, two cases are considered such that copy is not permitted at all according to an information source and that copy is permitted once but the obtained copy is forbidden to be copied again (generation limit copy control method). The former case is applied to an original software such as a DVD-ROM which is produced and dealt by a contents maker. The latter generation limit copy control method is applied to information which is broadcasted in broadcasting media, for example.

In the case of the generation limit copy control method, a system which is capable of controlling the copy generation effectively is desired. As the copy control information system which is capable of managing the copy generation, a CGMS (Copy Generation Management System) and a method using an electronic watermarking process are suggested.

The electronic watermarking process embeds information as a noise into a portion which exists in image data or music data and is not important for human perceptivity, namely, a portion which is not redundant with respect to music or image. Additional information, which was embedded into image data or music data by such an electronic watermarking process, was hardly removed from the image data or music data. Meanwhile, even after image data or music data are subject to a filtering process or data compressing process, the additional information as electronic watermarking information embedded thereinto can be detected from the image data or music data.

In the case of the copy control method using the electronic watermarking process, additional information to be embedded represents the following four states:

(1) "Copy Free";
(2) "One Copy";
(3) "No more Copy"; and
(4) "Never Copy", namely, it represents copy generation of image data or music data on which the electronic watermarking information was superposed and the copy limit state.

(1) "Copy Free" represents that music data or image data can be copied freely. (2) "One Copy" represents that music data or image data can be copied only once. (3) "No More Copy" represents that music data or image data are obtained from the music data or image data in the state of (2) "One Copy", and they are not allowed to be copied again. (4) "Never Copy" represents that music data or image data are never allowed to be copied.

In the case where the electronic watermarking information which was superposed on image data or music data is "One Copy", a judgment is made that the image data or music data can be copied and recorded and the recording is executed in a recording device which can execute the electronic watermarking process (namely, copy limit process), but the electronic watermarking information which was rewritten into "No More Copy" is superposed on the recorded image data or music data. In the case where the electronic watermarking information which was superposed on the image data or music data to be recorded is "No More Copy", a judgment is made that the image data or music data are not allowed to be copied and recorded and the recording is forbidden in the recording device which can execute the electronic watermarking process.

In the CGMS system, in the case of an analog image signal, for example, additional information of 2 bits for copy control is superposed on specified one horizontal period within the vertical blanking period, and in the case of a digital image signal, additional information of 2 bits for copy control is added to the digital image data so that the data are transmitted.

The contents of the information of 2 bits in the CGMS system (hereinafter, referred to as CGMS information) are:

[00] . . . copy free;
[10] . . . one copy (copy by only one generation); and
[11] . . . never copy.

In the CGMS system, the above-mentioned state "No More Copy" does not exist.

In the case where the CGMS information added to image information is [10], a judgment is made that the image information can be copied and recorded and the recording is executed in a recording device which can cope with CGMS, but the CGMS information which was rewritten into [11] is added to the recorded image signal. In the case where the CGMS information added to the image information to be recorded is [11], a judgment is made that the image signal is not allowed to be copied and recorded and the recording is forbidden in the recording device which can cope with CGMS.

Incidentally, in the case where the copy of an analog image signal or digital image signal is controlled by the CGMS system as mentioned above, the CGMS information of 2 bits is added to a specified position which is separated from a signal forming an image.

For this reason, in the case where, for example, the digital image signal to which the CGMS information was added is used, it is considered that when the digital image signal is converted into an analog image signal so as to be utilized, the CGMS information is possibly lost.

In this case, even when the digital image signal is forbidden to be copied by the CGMS information, by converting the digital image signal into an analog image signal, it becomes possible that the analog image signal is freely copied.

Therefore, as the additional information for copy control, it is considered that electronic watermarking information is superposed on information signals such as an analog image signal and a digital image signal so as to be provided. As mentioned above, since the electronic watermarking information is superposed on an information signal, it is difficult to remove the electronic watermarking information from the information signal or alter it.

In addition, since the electronic watermarking information can represent a copy generation and copy limit state of an information signal as mentioned above, in the recording device which can cope with the electronic watermarking process, the copy of the information signal can be controlled securely and properly based on the electronic watermarking information.

However, as mentioned above, in the case where the electronic watermarking information representing "One Copy" is superposed on an information signal, the information signal is copied based on the electronic watermarking information in the recording device which can cope with the electronic watermarking process. However, since the copied information signal is forbidden to be copied again, the electronic watermarking information added to the information signal to be recorded should be rewritten into "No More Copy".

In this case, the following two methods are considered. In one method, the electronic watermarking information representing "No More Copy" is overwritten on the information signal on which the electronic watermarking information representing "One Copy" was superposed. In the other method, after the electronic watermarking information representing "One Copy" is deleted from the information signal on which the electronic watermarking information representing "One Copy" was superposed, the electronic watermarking information representing "No More Copy" is newly superposed on the information signal.

However, in the former method, since the electronic watermarking information representing "No More Copy" is overwritten on the information signal on which the electronic watermarking information representing "One Copy" was superposed, an image which is formed by the image signal is possibly deteriorated.

In the latter method, the electronic watermarking information for deletion, which is the completely same as the electronic watermarking information representing "One Copy" superposed on an information signal, is generated at timing completely same as the electronic watermarking information representing "One Copy", and the electronic watermarking information for deletion is subtracted from the information signal so that the electronic watermarking information superposed on the information signal can be deleted.

However, it is difficult to generate the same electronic watermarking information in the information signal on which the electronic watermarking information was superposed at the timing completely same as the superposing of the electronic watermarking information. Particularly in the case where the information signal on which the electronic watermarking information was superposed is an analog signal, the timing is delayed easily, and the information signal is occasionally deteriorated by subtracting the electronic watermarking information.

SUMMARY OF THE INVENTION

In such points in view, it is an object of the present invention to provide an additional information superposing method of superposing different two pieces of additional information on an information signal with deterioration of the information signal being suppressed minimumly so as to be capable of transmitting the information signal, an information signal copy control method using additional information superposed on an information signal, an information signal output device and an information signal recording device.

In order to solve the above problem, a method in accordance with the invention for superposing second additional information as electronic watermarking information on an information signal on which first additional information as electronic watermarking information was superposed, is characterized in that the information signal is divided into a first area and a second area, the first additional information is superposed on the first area and the second additional information is superposed on the second area.

According to the additional information superposing method of the invention, the information signal is divided into the first area and the second area, and the first additional information and the second additional information as electronic watermarking information are superposed in the different areas.

As a result, the different two pieces of information are superposed on one information signal, and thus the information signal can be transmitted so that the two pieces of information can be extracted. Moreover, since the two pieces of information are not superposed on one area of the information signal, deterioration of the information signal, which is caused by superposing the additional information does not become serious.

In addition, according to another aspect of the invention, an additional information superposing method is characterized in that:

the first additional information and second additional information are information for limiting a copy generation of the information signal; and the first additional information represents a state before the copy generation is limited, and the second additional information represents a state after the copy generation is limited.

According to the additional information superposing method of the invention, for example, the information representing "Copy Once" is superposed on the first area of the information signal, and when the information signal is recorded on a recording medium, the information representing "Never Copy" is superposed on the second area of the information signal.

As a result, the copy generation of the information signal can be limited securely and properly based on the information before the copy generation is limited added to the first area of the information signal and the information after the copy generation is limited added to the second area. Moreover, since the information before the copy generation is limited (first additional information) and the information after the copy generation is limited (second additional information) are not superposed on one area of the information signal, the deterioration of the information signal, which is caused by superposing different pieces of additional information, can be prevented.

In addition, according to another aspect of the invention, an additional information superposing method is characterized in that the first area and second area are set as areas for each predetermined time length of the information signal.

According to the additional information superposing method of the invention, the first area and second area of the information signal on which the additional information is superposed are determined by a time length of the information signal in a manner that the information signal is divided by time such that the first 1 second is for the first area and the next 1 second is the for the second area, or the first 1 second is for the first area and 2 seconds are paused and the next 1 second is for the second area.

As a result, the first area and second area are determined in the time direction of the information signal, and the first additional information is superposed on the first area and the second additional information is superposed on the second area so that the information signal can be transmitted.

In addition, according to another embodiment of the invention, an additional information superposing method is characterized in that the first area and second area are set as areas for each predetermined data amount of the information signal.

According to the additional information superposing method of the invention, the first area and second area on which the additional information is superposed are determined based on predetermined data amount in a manner that in the case where the information signal is a digital signal, a block which is a processing unit of the digital signal is used as unit so that the first 3 blocks are for the first area and the next 3 blocks are for the second area.

As a result, the first area and second area are determined based on the data amount of the information signal, and the first additional information is superposed on the first area and the second additional information is superposed on the second area so that the information signal can be transmitted.

In addition, according to an additional embodiment of the invention, an additional information superposing method is characterized in that:

the information signal is an image signal; and the first area and second area are formed in a time direction by using a frame or field as unit.

According to the additional information superposing method, the information signal is an image signal, and the first area and second area are determined by using a frame or field as unit in a manner that the first area and second area are set alternatively per 1 frame or 1 field.

As a result, the first area and second area are determined by using a frame or field of the image signal as unit, and the first additional information is superposed on the first area and the second additional information is superposed on the second area so that the image signal can be transmitted.

In addition, according to yet another embodiment of the invention, an additional information superposing method is characterized in that:

the information signal is an image signal; and the first area and second area are formed separately within one frame or one field.

According to the additional information superposing method the information signal is an image signal, and the first area and second area are determined in an interval direction of the image signal in a manner that the upper half portion of each frame is for the first area and the lower half portion is for the second area or the upper half portion of continuous plural frames is for the first area and the lower half portion is for the second area.

As a result, the first area and second area are determined in a spatial direction of the image signal, and the first additional information is superposed on the first area and the second additional information is superposed on the second area so that the image signal can be transmitted.

The first additional information of the first area which is superposed on the information signal as mentioned above is monitored, or the second additional information of the second area is monitored or the first additional information of the first area and the second additional information of the second area are monitored so that a judgment is made as to whether or not the information signal can be copied. Then, the recording can be controlled properly, and the second additional information is superposed on the second area if necessary so that the information signal can be transmitted.

BRIEF DESCRIPTION OF THE DRAWINGS

FIG. 3 is a diagram for explaining various timing signals generated in the timing signal generating section 32 and a PN code string generated by using the timing signals;

FIG. 6 is a block diagram for explaining a constitutional example of a set top box as the information signal output device of the present invention which receives an information signal outputted from the information signal output device in FIG. 1;

FIG. 11 is a diagram for explaining various timing signals generated in a timing signal generating section 683 shown in FIG. 10 and a rewriting-use PN code string generated by using the timing signals;

DESCRIPTION OF THE PREFERRED EMBODIMENTS

There will be described below one embodiment of an additional information superposing method, an information signal copy control method, an information signal output device and an information signal recording device according to the present invention with reference to the drawings.

The embodiment described below refers to a case that the information signal output device of the present invention is applied to a broadcasting device in a broadcasting station and to a set top box (receiver) for receiving digital broadcasting, the information signal recording device of the present invention is applied to a recording device for recording an output signal from a set top box onto a recording medium.

Namely, the embodiment described below is an example that the digital broadcasting from a broadcasting station is received by the set top box (receiver), for example, and its received signal is recorded onto the recording medium by the recording device provided separately from the receiver.

The digital broadcasting can provide various digital information such as image information, sound information, text information and so on, but in order to simplify the description, the following description will refer to a case that image information (image signal) is provided by the digital broadcasting.

As mentioned later, CGMS information as information for copy control is added to an image signal provided by digital broadcasting, and electronic watermarking information WM is superposed on the image signal so that the image signal is provided. In this embodiment, copy control information (copy generation limit information) is spectrum spread by using codes of PN (Pseudorandom Noises) (hereinafter, referred to as PN codes), and the copy control information which was spectrum spread (spread spectrum signal) as electronic watermarking information WM is superposed on the image signal.

In addition, a disk on which an image signal is recorded is a DVD. In the following description, a rewritable DVD is called as a RAM disk, and a non-rewritable read-only DVD is called as a ROM disk. Moreover, a recording device and a reproducing device which can cope with a copy generation limit process are called as compliant devices, and a device which cannot cope with the copy generation limit process is called as a non-compliant device.

[Information Signal Output Device]

Figure 1:
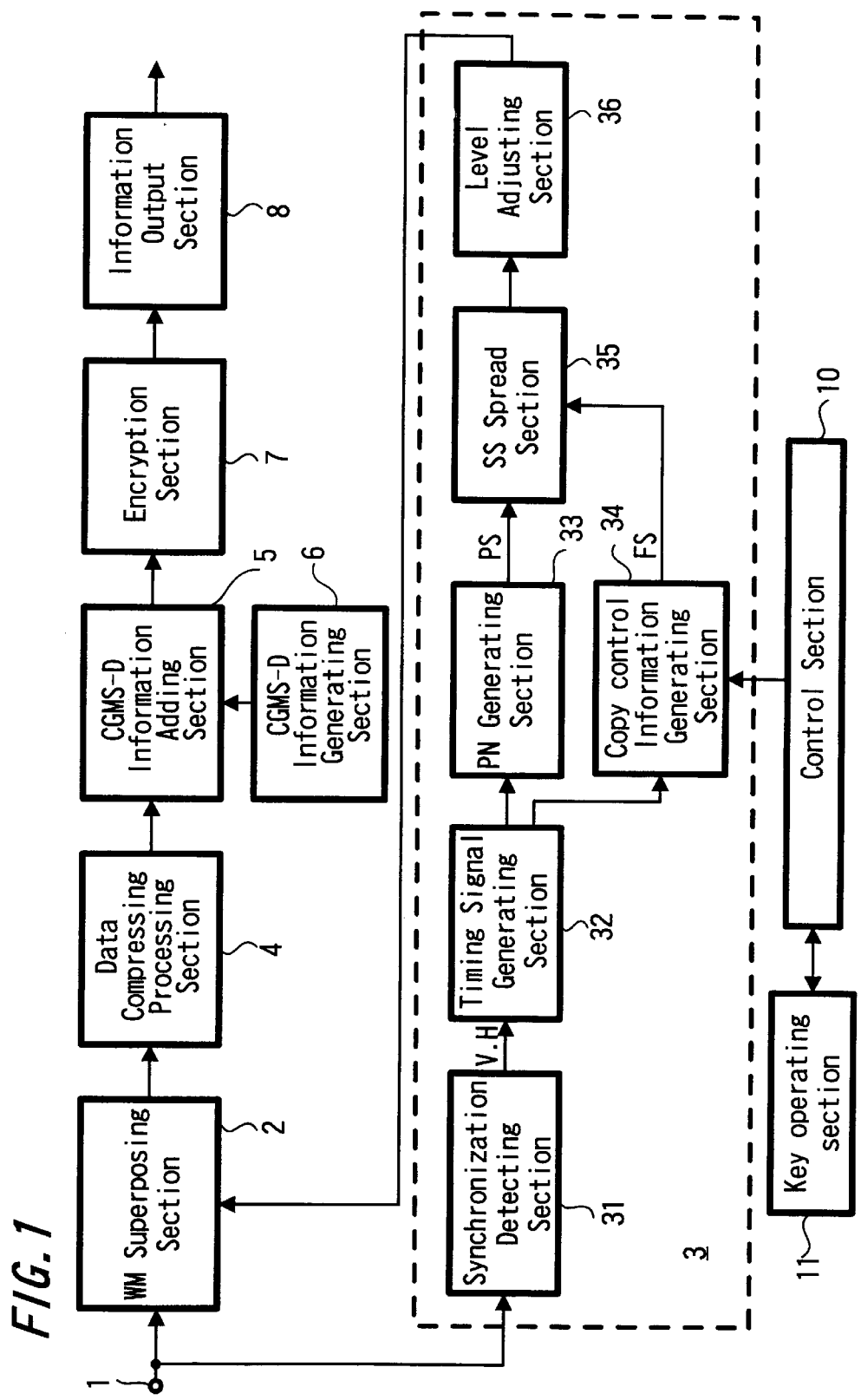
FIG. 1 is a block diagram for explaining an information signal output device according to one embodiment of the present invention to which an additional information superposing method according to one embodiment of the present invention is applied.

FIG. 1 is a block diagram for explaining the information signal output device to be used in a broadcasting station for executing digital broadcasting in the present embodiment. The information signal output device shown in FIG. 1 superposes the electronic watermarking information WM or adds CGMS information on and to an image signal to be broadcasted and gives another necessary processes to the image signal so as to form and output a digital image signal to be broadcasted.

As shown in FIG. 1, the information signal output device according to the present embodiment includes an input terminal 1, an electronic watermarking information superposing section (hereinafter, referred to as WM superposing section) 2, an electronic watermarking information forming section (hereinafter, referred to as WM forming section) 3, a data compressing section 4, a CGMS-D information adding section 5, a CGMS-D information generating section 6, an encryption section 7 and a signal output section 8. Moreover, as shown in FIG. 1, the WM forming section 3 includes a synchronization detecting section 31, a timing signal generating section 32, a PN generating section 33, a copy control information generating section 34, an SS spread section 35 and a level adjusting section 36.

Figure 2:
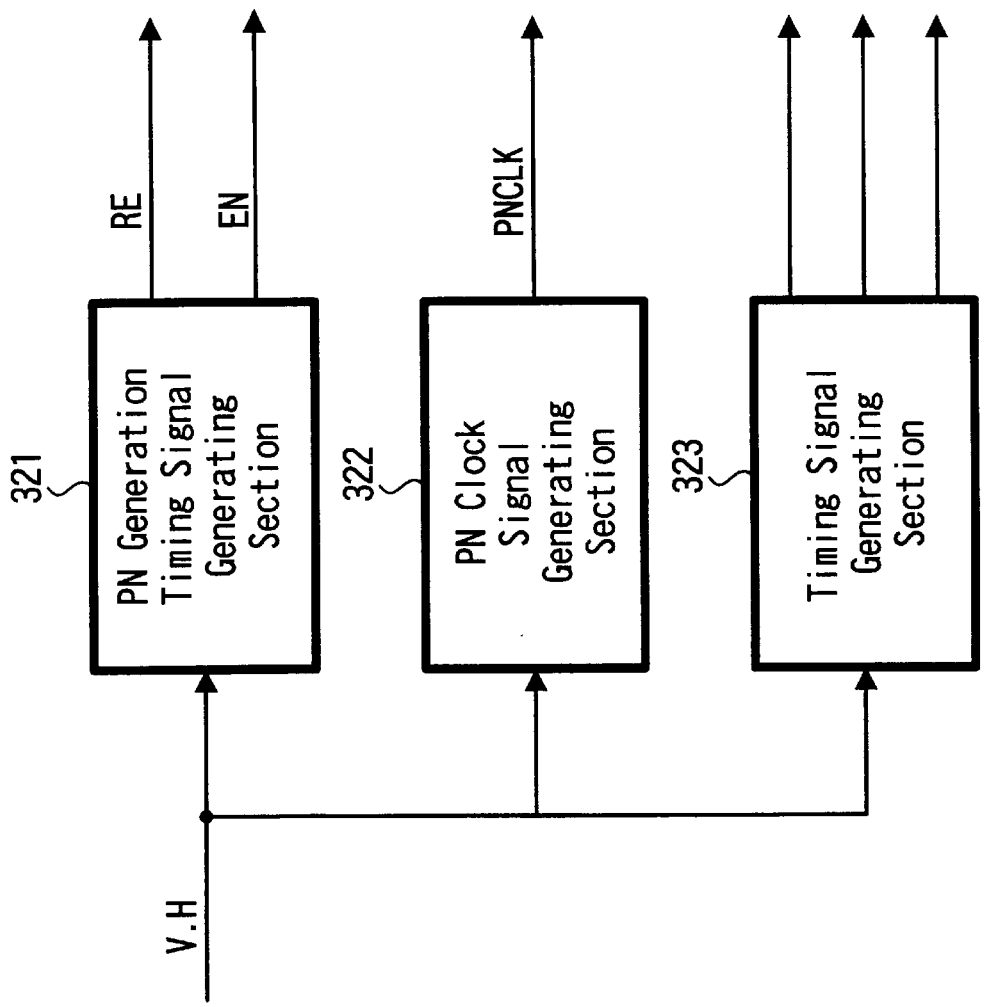
FIG. 2 is a block diagram for explaining a timing signal generating section 32 shown in FIG. 1.

In addition, FIG. 2 is a block diagram for explaining the timing signal generating section 32 of the information signal output device according to the present embodiment. As shown in FIG. 2, the timing signal generating section 32 includes a PN generation timing signal generating section 321, a PN clock signal generating section 322 composed of a PLL and a timing signal generating section 323.

An image signal to be broadcasted is supplied to the WM superposing section 2 and the synchronization detecting section 31 of the WM forming section 3 via the input terminal 1. The synchronization detecting section 31 detects a vertical synchronization timing signal V and a horizontal synchronization timing signal H from the supplied image signal, and supplies the detected output to the timing signal generating section 32.

The timing signal generating section 32 generates a PN code reset timing signal RE (hereinafter, simply referred to as the rest signal RE) representing a PN code generation start timing, a PN generation enable signal EN (hereinafter, simply referred to as the enable signal EN) representing an interval where PN codes are generated and a clock signal PNCLK by using the vertical synchronization timing signal V and the horizontal synchronization timing signal H as reference signals.

In the present embodiment, the horizontal synchronization timing signal H and the vertical synchronization timing signal V from the synchronization detecting section 31 are supplied to the PN generation timing signal generating section 321 and the timing signal generating section 323, and the horizontal synchronization timing signal H from the synchronization detecting section 31 is supplied to the PN clock generating section 322.

The PN generation timing signal generating section 321 generates a rest signal RE for determining a repetition period of spread-use PN code strings used for spectrum spread as shown in FIG. 3(C) by using the vertical synchronization timing signal V (see FIG. 3(A)) and the horizontal synchronization timing signal H (see FIG. 3(B)) as reference signals. In this example, the reset signal RE is a signal with a period of ½ frame.

Further, in this example, the PN generation timing signal generating section 321 generates an enable signal EN by using the vertical synchronization timing signal V (see FIG. 3(A)) and the horizontal synchronization timing signal H (see FIG. 3(B)) as reference signals. In this example, the enable signal EN is generated as a signal for generating the PN codes from the PN generating section 33 with an interval of ½ frame (see FIG. 3(D)). Namely, as shown in FIG. 3(D), the enable signal EN is a signal that a signal interval of low level and a signal interval of high level are repeated alternatively at every ½ frame. The enable signal EN is low active.

The PN clock generating section 322 generates the PN clock PNCLK (see FIG. 3(E)) which is synchronized with the horizontal synchronization timing signal H by using a PLL. Moreover, the timing signal generating section 323 generates various timing signals to be used in the information signal output device shown in FIG. 1 based on the vertical synchronization timing signal V and the horizontal synchronization timing signal H.

Then, the reset signal RE, enable signal EN and PN clock signal PNCLK of the signals generated in the timing signal generating section 32 are supplied to the PN generating section 33. Moreover, the enable signal EN and the PN clock signal PNCLK are supplied also to the copy control information generating section 34.

The PN generating section 33 generates PN codes according to the reset signal RE, the enable signal EN and the clock signal PNCLK. Namely, the PN generating section 33 is reset with the period of ½ frame by the reset signal RE in this example, and generates a PN code string PS with a predetermined code pattern starting from its head. The PN generating section 33 generates the PN code string PS according to the clock signal PNCLK only when the PN code generation possible state (enable state) is obtained by the enable signal EN.

In this case, as mentioned above, since the PN generating section 33 is brought into a state of being capable of generating the PN codes when the enable signal EN is in a low level, as shown in FIG. 3(F) the PN generating section 33 is in the state of generating the PN code at every other ½ frame, and generates the PN code by 1 chip per every 1 clock of the PN clock signal PNCLK.

Then, the PN generating section 33 is reset at its head at every ½ frame by the reset signal RE. In the present embodiment, the PN code string PS with predetermined code pattern is generated from its head in a first half portion of one frame (½ frame) according to the enable signal EN as shown in FIG. 3(D). Namely, the PN code string PS with the predetermined code pattern is generated at every other ½ frame. The PN code string PS obtained from the PN generating section 33 in such a manner is supplied to the SS spread section 35.

The PN generating section 33 generates the PN code string PS of M sequence based on the enable signal EN, PN clock signal PNCLK, reset signal RE in such a manner. The PN generating section 33 includes a multi-staged shift register, not shown and some of exclusive-OR circuits for operating suitable tap outputs of the shift register.

Meanwhile, the copy control information generating section 34 generates copy control information as additional information, which is spectrum spread and superposed on the image signal inputted via the input terminal 1, at the timing of the enable signal EN from the timing signal generating section 32 based on the clock PNCLK. The copy control information generating section 34 outputs the copy control information based on the clock PNCLK so as to supply the same to the SS spread section 35. Namely, the copy control information generating section 34 forms a copy control information string FS at the timing same as the PN code string PS and supplies it to the SS spread section 35.

In the present embodiment, in the copy control information generating section 34, in the case where an image signal to be transmitted is recognized as being copied freely, information representing "Copy Free" is generated. In the case where the image signal is not recognized at all as being copied, information representing "Never Copy" is generated. Moreover, in the case where the image signal to be transmitted is recognized as being copied only once, information representing "One Copy" is generated.

The copy control information generating section 34 can generate information of low bit rate representing the copy control states such as "Copy Free", "No Copy", "One Copy" and the like as copy control information. Further, the copy control information generating section 34 can generate the copy control information according to an image signal to be recorded on a DVD 100 under the control by a control section 10.

The SS spread section 35 multiplies the copy control information string FS by the PN code string PS to thereby generate a spectrum spread signal. The spectrum spread signal is supplied to the WM superposing section 2 via the level adjusting section 36 and is superposed as electronic watermarking information on an input image signal Vi. The level adjusting section 36 adjusts a superposing level by superposing the electronic watermarking information by such an extent to avoid deteriorating of an reproduced image. In this case, the spectrum spread signal (electronic watermarking information) is superposed with a level which is smaller than a dynamic range of the image signal.

In this case, as mentioned with reference to FIG. 3, the PN code string PS and the copy control information string FS are generated in the first half portion (½ frame) of each frame of the image signal, and the spectrum spread signal, which represents a state of the copy control formed by multiplying them, is superposed on the image signal.

Figure 4A:
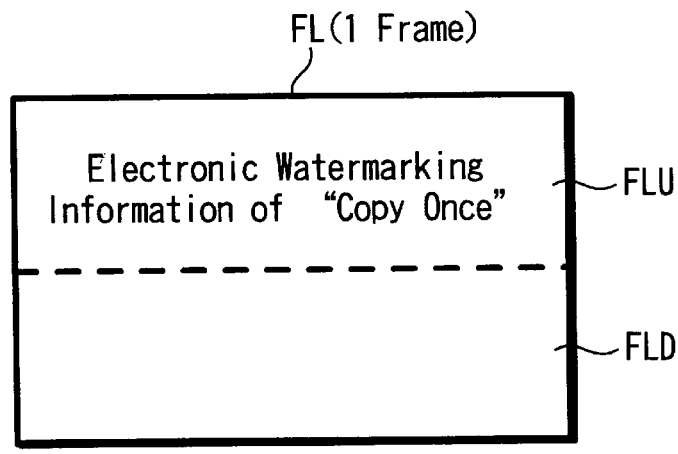
FIG. 4 is a diagram for explaining a superposing state of electronic watermarking information to be superposed on an image signal in the information signal output device shown in FIG. 1.

Therefore, when the copy control information generated in the copy control information generating section 34 is "Copy Once", as shown in FIG. 4A, the spectrum spread signal representing the state of "Copy Once" is superposed on an area FLU in the first half portion of each frame FL of the image signal.

Figure 4B:
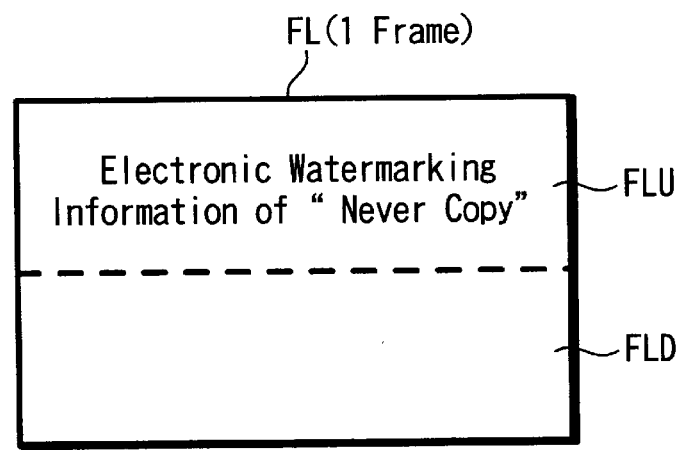
Figure 4C:
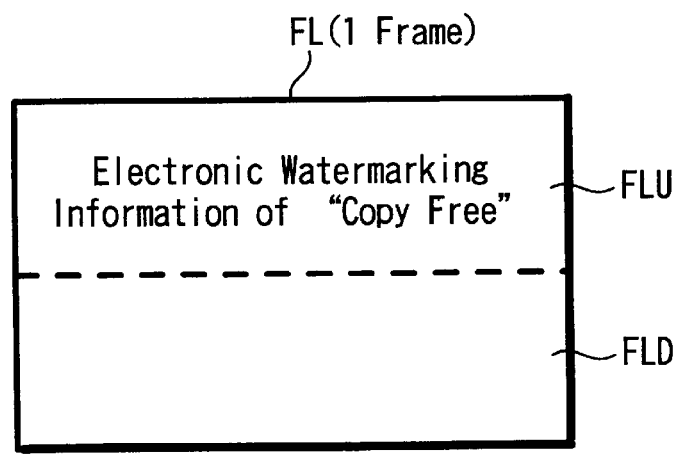

Similarly, when the copy control information generated in the copy control information generating section 34 is "Never Copy", as shown in FIG. 4B, the spectrum spread signal representing the state of "Never Copy" is superposed on the area FLU in the first half portion of each frame FL of the image signal. When the copy control information generated in the copy control information generating section 34 is "Copy Free", as shown in FIG. 4C, the spectrum spread signal representing the state of "Copy Free" is superposed on the area FLU in the first half portion of each frame FL of the image signal.

Namely, the area FLU in the first half portion of each frame FL of the image signal is set as a first area, and an area FLD in the latter half portion is set as a second area. The spectrum spread signal, which is formed by spectrum spreading the copy control information, is superposed on the first area. As detailed later, in the case where copy generation of the image signal is limited, for example, the copy control information whose copy generation was limited is spectrum spread and superposed on the second area of each frame of the image signal in the recording device. Therefore, in the information signal output device according to the present embodiment, the spectrum spread signal is not superposed on the second area.

The image signal on which the spectrum spread signal is superposed as electronic watermarking information representing the state of the copy control is supplied to the data compressing processing section 4. The data compressing processing section 4 compresses in data the supplied image signal according to the MPEG method, and supplies the same to the CGMS-D information adding section 5. The CGMS-D information adding section 5 adds CGMS-D information, which is supplied from the CGMS-D generating section 6, to the data-compressed digital image signal.

The CGMS-D information generating section 6 generates the CGMS-D information to be added to the image signal to be transmitted. In this case, the CGMS-D information to be added is determined according to the information to be transmitted. The CGMS-D information which is generated in the CGMS-D information generating section 6 represents any one of "Copy Free [00]", "Copy Once [10]" and "Never Copy [11]".

Namely, in the case where the image signal to be transmitted is recognized as being copied freely, the CGMS-D information generating section 6 generates the CGMS-D information [00] representing "Copy Free". In the case where the image signal is recognized as never being copied, the CGMS-D information generating section generates the CGMS-D information [11] representing "Never Copy". In the case where the image signal to be transmitted is recognized as being copied once, the CGMS-D information generating section generates the CGMS-D information representing "Copy Once [10]".

In the CGMS-D information adding section 5, the image signal to which the CGMS information was added is supplied to the encryption section 7. In the present embodiment, the encryption section 7 gives an encryption process of CSS (Contents Scramble System) to the image signal. The encryption process of CSS is an encryption processing system applied to an information signal in the case where the information signal such as an image signal or the like is recorded on a ROM or the like disk and is provided.

The image signal which is subjected to the encryption process in the encryption section 7 is supplied to the signal output section 8, and after the image signal undergoes a process for output such as a level amplifying process or the like, it is broadcasted to a user (receiver) via an antenna and a cable, for example.

The information signal output device according to the present embodiment superposes the spectrum spread signal (electronic watermarking information), which was formed by spectrum spreading the image signal to be outputted as copy control information, on the first area of each frame of the image signal, and adds the CGMS-D information to the image signal so as to output the same.

Since the electronic watermarking information is superposed on the image signal, even if a digital image signal on which the electronic watermarking information was superposed is converted into an analog image signal, the electronic watermarking information is not removed. Moreover, even if the electronic watermarking information is superposed on the image signal, the image signal is not deteriorated.

FIG. 5 shows a relationship between the copy control information to be superposed as electronic watermarking information and the image signal in the form of spectrum. The copy control information includes a small quantity of information and thus is a signal with low bit rate, and as shown in FIG. 5(a), it is a signal with a narrow bandwidth. When the copy control information is spectrum spread, it becomes a signal with a wide bandwidth as shown in FIG. 5(b). At this time, a spectrum spread signal level is inversely proportional to an enlarging ratio of bandwidth and thus becomes lower.

Figure 5A:
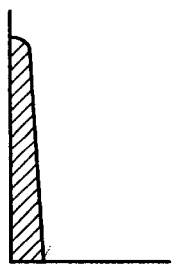
FIG. 5 is a diagram for explaining the electronic watermarking information and the information signal on which the electronic watermarking information is superposed.
Figure 5B:
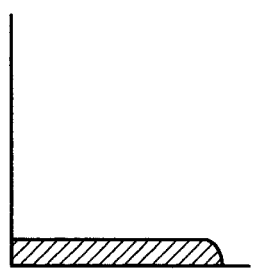
Figure 5C:
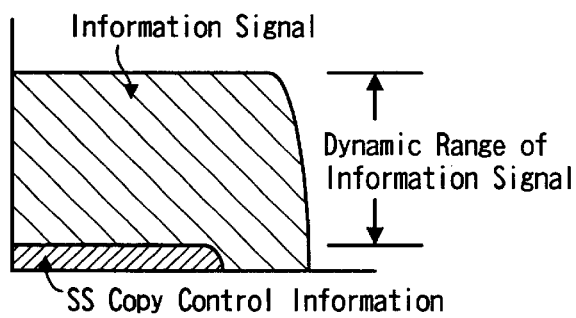

The spectrum spread signal (SS copy control information (SS means spectrum spread)) is superposed on the image signal Vi by the WM superposing section 2, but in this case as shown in FIG. 5(c), the SS copy control information is superposed with a level smaller than a dynamic range of the image signal as an information signal. As a result, the main information signal can be hardly deteriorated. Therefore, as mentioned above, when the image signal on which the SS copy control information was superposed is supplied to the monitor image receiver and the image is reproduced, the image is hardly influenced by the SS copy control information, and thus the satisfactory reproduced image can be obtained.

Figure 5D:
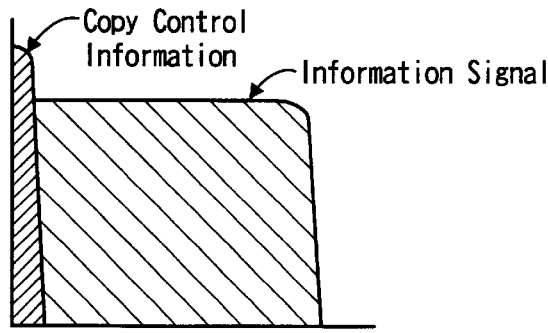

Meanwhile, as mentioned later, when the image signal is spectrum spread inversely in order to detect the SS copy control information, as shown in FIG. 5(d), the SS copy control information is restored as a signal with a narrow bandwidth. When sufficient bandwidth spread factor is given, an electric power of the inversely spread copy control information exceeds the information signal so that the SS copy control information can be detected.

In this case, since the electronic watermarking information superposed on the image signal is superposed at the same time and within the same frequency as the image signal, the electronic watermarking information cannot be deleted or corrected only by a frequency filter or simple replacement of information.

Therefore, the electronic watermarking information (SS copy control information) superposed on the image signal is not removed, and its alternation is difficult. As a result, the copy control which prevents illegal copy securely can be made.

In addition, in the above structure, the spectrum spread is executed by using the PN code string which is formed by using the vertical synchronization timing signal V and the horizontal synchronization timing signal H as reference signals. For this reason, a PN code string for inverse spectrum spread, which is required for detecting the spectrum spread signal from the image signal, can be easily generated by using the vertical synchronization timing signal V and the horizontal synchronization timing signal H detected from the image signal as reference signals. As a result, the spectrum spread signal which is superposed on the image signal can be detected quickly and accurately.

Here, in order to simplify the description, in the following description, the electronic watermarking information represents "Copy Once", "No More Copy", "Never Copy" and "Copy Free".

[Set Top Box]

FIG. 6 is a block diagram showing a constitutional example of the set top box to be used in the present embodiment. The set top box receives a digital broadcasting which is broadcasted via the information signal output device described with reference to FIG. 1, and forms a signal to be supplied to the monitor image receiver, the recording device and the like so as to output the signal.

As shown in FIG. 6, the set top box in the present embodiment comprises a channel select section 41, a descramble section 42, a demultiplex section 43, a video data decode section 44, a D/A converting circuit 45, a CGMS-A superposing section 46, an output terminal 46a for an analog image signal, a CGMA-D decode section 47, an electronic watermarking information decode section (hereinafter, referred to as WM decode section) 48, an encryption section 49, an IEEE1394 bus interface 50, an output terminal 50d for a digital image signal, and a control section 40.

As shown in FIG. 6, when a channel select control signal according to a channel select operation by a user is supplied from the control section 40 to the channel select section 41, a signal of the channel selected in the channel select section 41 is supplied to the descramble section 42 so as to undergo a descramble process for descrambling the scramble applied to a broadcasting signal. The descrambled channel signal is supplied to the demultiplex section 43. In the demultiplex section 43, since the output signal from the channel select section 41 includes a plurality of broadcasting programs, data of the broadcasting program according to the broadcasting program select operation by the user from the control section 40 are extracted.

Video data Di of the broadcasting program from the demultiplex section 43 are MPEG compressed. For this reason, in order to supply to a display monitor device, for example, the data Di from the demultiplex section 43 are supplied to the video data decode section 44 and MPEG decoded and expanded to be decoded. The MPEG decoded data are converted into an analog signal by the D/A converter 45 so as to be supplied to the CGMS-A superposing section 46.

The CGMS-A superposing section 46 superposes CGMS-A information on a predetermined horizontal interval of a vertical blanking period of the analog image signal based on the information from the control section 40. In this case, the control section 40 sets CGMS-A information which is superposed on the analog image signal to be outputted based on CGMS-D information from the CGMS-D decode section 47, and the copy control information from the WM decode section 48 mentioned later, and supplies the CGMS-A information to the CGMS-A superposing section 46 so as to superpose the same on the analog image signal.

The analog image signal, on which the CGMS-A information was superposed by the CGMS-A superposing section 46, is supplied to the display monitor device, for example, via the analog output terminal 46*a*.

In the present embodiment, the MPEG compressed video data Di from the demultiplex section 43 become a digital output via an interface bus of IEEE1394 standard.

In the interface of IEEE1394 standard, in order to prevent an illegal copy, transmission digital information undergoes encryption, but verification is made as to whether or not an output destination is a compliant device, and CGMS-D information added to the image signal as copy control information and copy control information which is spectrum spread and is superposed as electronic watermarking information on the image signal are verified. Then, a determination is made according to the verified results as to whether or not a key for descrambling the encryption is transmitted to the output destination.

The above communication control system is called as an IEEE1394 secure bus, and thus the digital interface is designed to effectively prevent the illegal copy.

The output data Di of the demultiplex section 43 are supplied to the CGMS-D decode section 47 and the WM decode section 48 so that the CGMS-D information or electronic watermarking information WM added to or superposed on the broadcasting program data is extracted.

The CGMS-D information is extracted as information of 2 bits in a specified position separated from the video data, and the information of 2 bits is supplied to the control section 40.

In the present embodiment, the electronic watermarking information WM is superposed as a spectrum spread signal on the image signal as an information signal. Namely, as mentioned above, in this example, a PN code to be used as a spread code is generated with a sufficiently early period, and it is multiplied by the copy control information as additional information so that the copy control information is spectrum spread. As a result, the copy control information with a narrow bandwidth and a high level is converted into a signal with a wide bandwidth and a low level which does not influence the image signal. Then, the spectrum spread copy control information is superposed on the video data so as to be transmitted.

Figure 7:
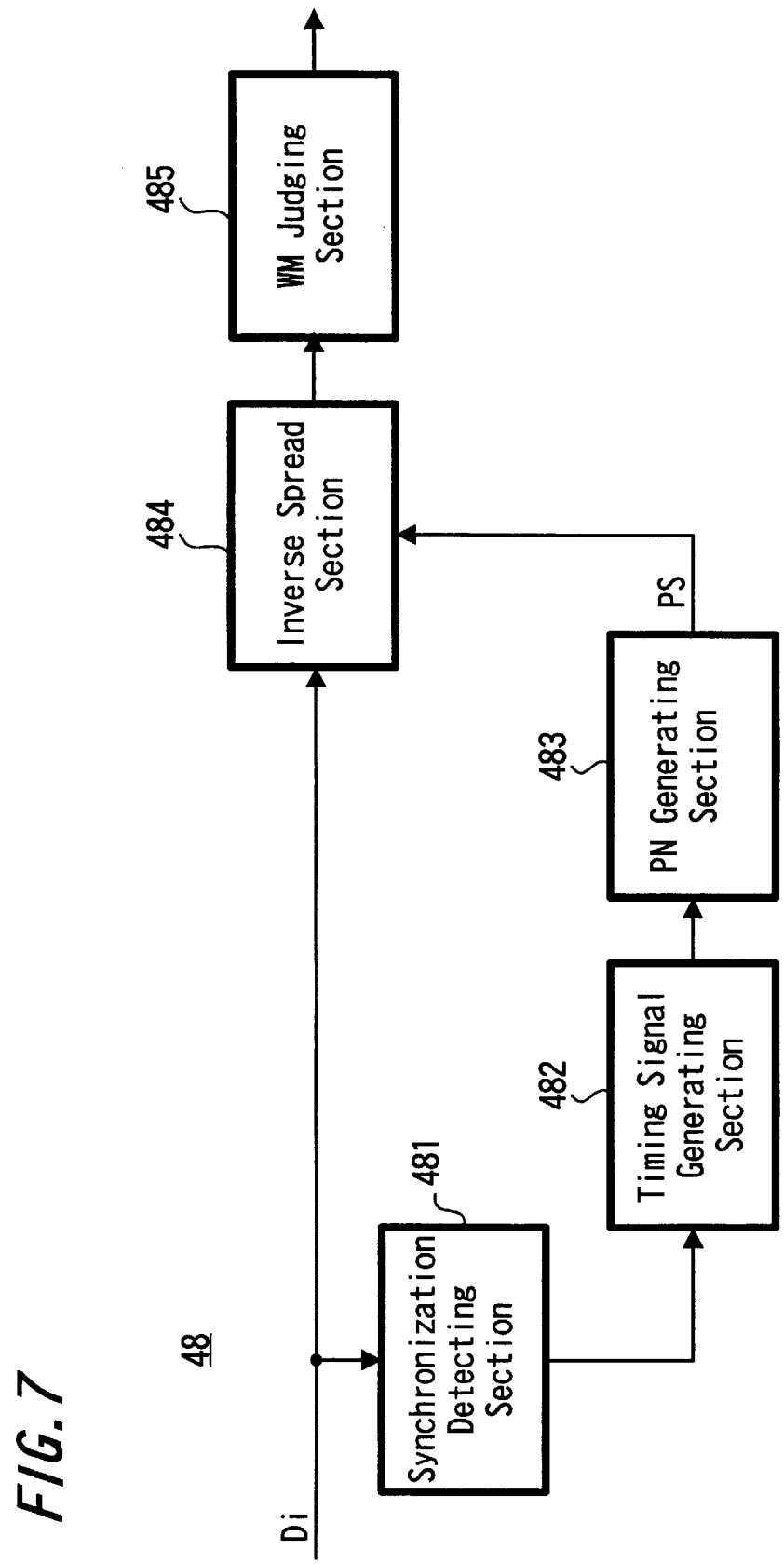
FIG. 7 is a block diagram for explaining a WM detecting section 48 of the set top box shown in FIG. 6.

The WM decode section 48, which extracts and discriminates the electronic watermarking information WM (SS copy control information) superposed in such a manner, can be constituted as shown in FIG. 7. Namely, as shown in FIG. 4, the video data Di from the demultiplex section 43 are supplied to an inverse spread section 484 and also to a synchronization detecting section 481. The synchronization detecting section 481 detects the vertical synchronization timing signal V and the horizontal timing signal H, and supplies the detected output to a timing signal generating section 482.

The timing signal generating section 482 is constituted similarly to the timing signal generating section 32 of the above-mentioned information signal output device, and generates a rest signal RE, an enable signal EN, a clock signal PNCLK and another timing signals based on the supplied vertical synchronization timing signal V and the horizontal synchronization timing signal H. To this end, the timing signal generating section 482 of the set top box is constituted similarly to the timing signal generating section 32 shown in FIG. 2, and thus the description thereof will be given by using the same reference numerals.

The PN generation timing signal generating section 321 generates the reset signal RE as shown in FIG. 8(C) by using the vertical synchronization timing signal V (see FIG. 8(A)) and the horizontal synchronization timing signal H (see FIG. 8(B)) as reference signals. The reset signal RE is a signal of ½ frame period similarly to the reset RE used in the above-mentioned information signal output device.

Moreover, the PN generation timing signal generating section 321 generates the enable signal EN by using the vertical synchronization timing signal (see FIG. 8(A)) and the horizontal synchronization timing signal H (see FIG. 8(B)) as reference signals. In this example, the enable signal EN is generated as a signal for generating a PN code from a PN generating section 483 in each frame (see FIG. 8(D)). Namely, as shown in FIG. 8(D), the enable signal EN is a low active signal, and in the set top box, it becomes a low level signal in any frame.

The PN clock generating section 322 generates a PN clock PNCLK (see FIG. 8(E)) which is synchronized with the horizontal synchronization timing signal H by using a PLL. Moreover, the timing signal generating section 323 generates various timing signals to be used in the information signal output device shown in FIG. 1 based on the vertical synchronization timing signal V and the horizontal synchronization timing signal H.

The reset signal RE, the enable signal EN and the PN clock signal PNCLK, which were generated in the timing signal generating section 482, are supplied to the PN generating section 483.

The PN generating section 483 is constituted in the manner similar to the PN code generating section 32 of the above-mentioned information signal output device. The PN generating section 483 generates a PN code string PS (invert spread-use PN code string), which is the same as that obtained by spectrum spreading the copy control information, at every ½ frame according to the reset signal RE, the enable signal EN and the clock signal PNCLK at the timing same with respect to the image signal.

Namely, the PN generating section 483 is reset by the reset signal RE at a ½ frame period in this example, and only when being in a PN code generation possible state (enable state) by the enable signal EN, the PN generating section 483 generates the PN code string PS according to the clock signal PNCLK. As a result, the PN code string PS of a predetermined code pattern is generated at every ½ frame starting from its head.

As a result, as shown in FIG. 8(F), the PN generating section 483 of the set top box generates the PN code string PS which is repeated at every ½ frame. Namely, the PN generating section 483 generates the PN code string PS in the first area on the first half portion and in the second area on the latter half portion of each frame of the image signal. The PN code string PS from the PN generating section 483 obtained in such a manner is supplied to the inverse spread section 484.

In the inverse spread section 484, the PN code string PS from the PN generating section 483 is inversely spread by using the same as an inverse spread-use spread code, and a copy control information string FS which is spectrum spread and is superposed on an image signal is obtained. The copy control information string FS is supplied to a WM judging section 485 so as to be judged as to its copy control state. The judged output is supplied to the control section 40.

Here, in this set top box, as mentioned above, the PN code string PS is generated in both the first area and the second area of each frame of the image signal in each frame of the image signal, and it is inversely spread so that spectrum spread signals are detected from both the first area and the second area of each frame of the image signal.

As a result, the control section 40 can securely judge as to whether the image signal can be copied or is forbidden to be copied based on the spectrum spread signal, which was spectrum spread and superposed on the first area and the spectrum spread signal, which was spectrum spread and superposed on the second area, for example.

For example, when the spectrum spread signal "Copy Once" is superposed on the first area of each frame of an image signal and the spectrum spread signal is not superposed on the second area, the image signal is judged as a signal of "Copy Once".

In addition, when the spectrum spread signal representing "Copy Once" is superposed on the first area of each frame of an image signal and the spectrum spread signal representing "No More Copy" is superposed on the second area, the image signal can be judged as a signal of "No More Copy".

In addition, when the spectrum spread signal representing "Copy Once" is superposed on the first area of each frame of an image signal and the copy control information of "Copy Once", "Copy Free" or "Never Copy" as the spectrum spread signal, which is not originally pared with the signal of "Copy Once", is superposed on the second area, the image signal is judged as not a normal image signal, and the process thereinafter can be stopped, for example.

Furthermore, the output data of the demultiplex section 43 are supplied to the encryption section 49, and compressed video data are encrypted by control of the control section 40 based on cipher keys different from each other at every communication. The encryption data from the encryption section 49 are supplied to an electronic equipment as an output destination via the IEEE1394 interface 50 and via the output terminal 50d. The IEEE1394 interface 50 converts the data so that the data conform to the IEEE1394 interface standard and outputs the converted data.

At this time, the control section 40 communicates with the equipment as the output destination via the IEEE1394 interface 49, and a judgment is made as to whether or not the equipment as the output destination is the compliant-device, and if the compliant device, a judgment is made as to whether or not it is a recording device.

The control section 40 determines as to whether or not the cipher key information for releasing the encryption in the encryption section 49 is transmitted to the output destination based on the judged outputs of the copy control information from the CGMS-D decode section 47 and the WM decode section 48 and judged information of the equipment of output destination via the IEEE1394 interface 50.

When the output destination is the non-compliant device, for example, the cipher key information is not transmitted to the device of output destination. Moreover, in the case where the output destination is the compliant device and it is a recording device, when the CGMS-D information is [11] or an image signal is judged as being "Never Copy" or "No More Copy" based on copy control information which is spectrum spread and is superposed on the first area and the second area of the image signal, the cipher key information is not transmitted to the device of output destination.

The set top box of the present embodiment receives a digital broadcasting signal on which electronic watermarking information as copy control information was superposed and CGMS-D information as another copy control information was added to be broadcasted, and as mentioned above execute necessary processes such as the descramble process (decipher process), the process for expanding the compressed digital image signal and the like so as to form and output an analog image signal to be supplied to the monitor image receiver and a digital image signal to be outputted via the digital interface.

In this case, electronic watermarking information and CGMS-A information are superposed on and added to the analog image signal to be supplied to the monitor image receiver or the like. Moreover, electronic watermarking information is superposed on and CGMS-D information is added to the digital image signal to be outputted via the IEEE1394 interface 50.

In the compliant recording device which receives the analog image signal or digital image signal from the set top box and records the received signal onto a RAM disk, copy of the image signal is controlled by using the electronic watermarking information and the CGMS information.

In the present embodiment, the encryption process is effected on information signal such as the digital image signal outputted from the information signal output device and the digital image signal outputted from the set top box and the like which is to be supplied to the recording device. As a result, since the copy is controlled based on the electronic watermarking information and the CGMS information and also the reproduction of the information signal can be limited by encryption, the copyright of information signal can be protected firmly.

[Compliant Recording Device]

Figure 9:
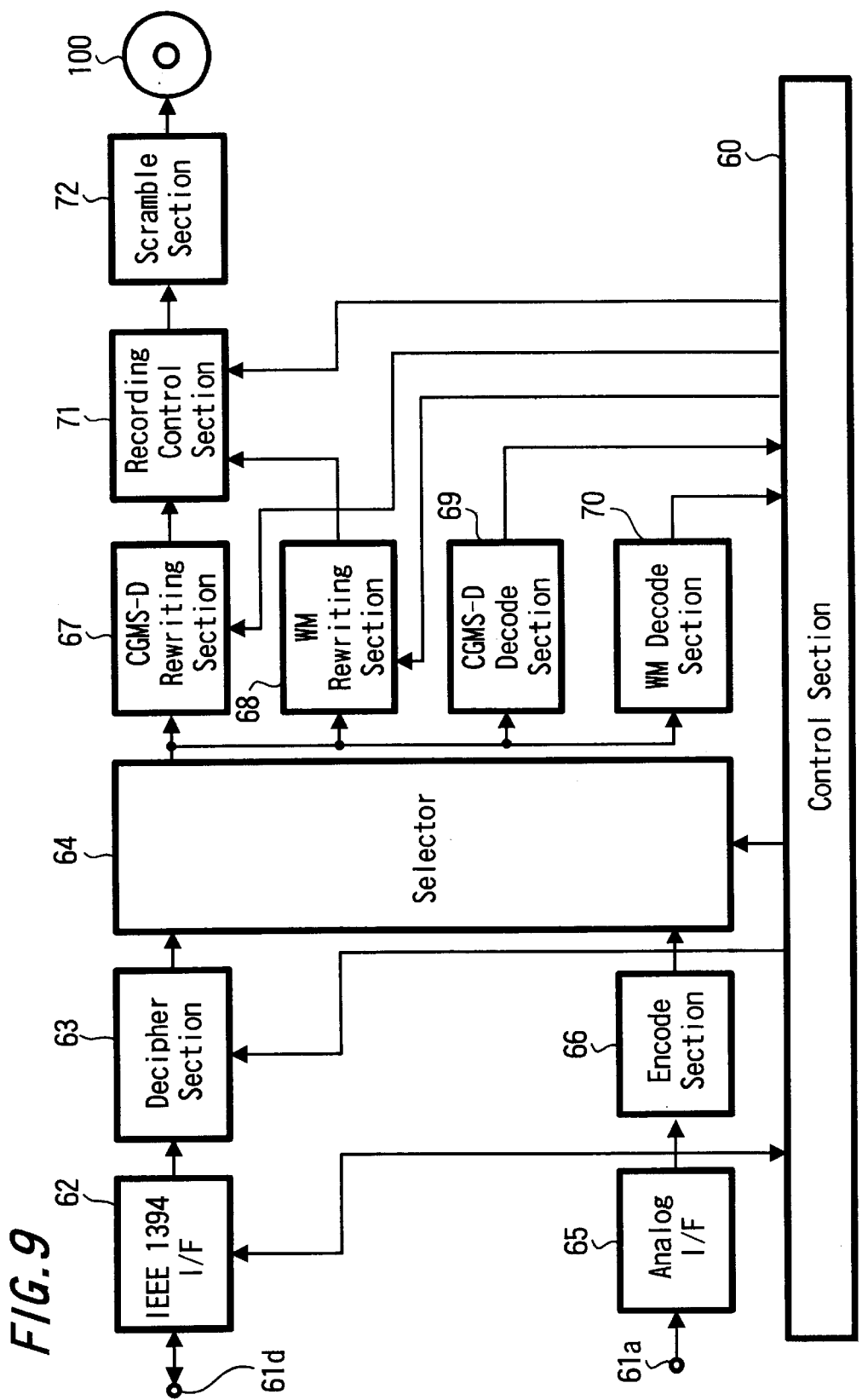
FIG. 9 is a block diagram for explaining an information signal recording device according to one embodiment of the present invention to which the additional information superposing method according to one embodiment of the present invention is applied.

There will be described below the compliant recording device. FIG. 9 is a block diagram of a constitutional example of the compliant recording device. The compliant recording device receives the image signal outputted from the set top box described in connection with FIG. 6 and can record it onto the DVD 100.

As shown in FIG. 9, the compliant recording device includes a digital input terminal 61d for the IEEE1394 interface and an analog input terminal 61a. The digital input terminal 61d is connected with an IEEE1394 interface 62. The IEEE1394 interface 62 brings data, which were converted conforming to the IEEE1394 bus interface standard, into their original form.

The data from the IEEE1394 interface 62 are supplied to a decipher section 63. As mentioned above, when the equipment connected to the digital input terminal 61d judged that an information signal can be copied, cipher key information for decipher is transmitted from the equipment. When the cipher key information is obtained, the decipher section 63 deciphers the data from the IEEE1394 interface 62 so as to be capable of restoring the compressed video data. The restored compressed video data are supplied to a selector 64.

In addition, video information inputted via the analog input terminal 61a is supplied to a compression encode section 66 via an analog interface 65 so as to be MPEG compressed and then is supplied to the selector 64.

The selector 64 selects any one of the data from the decipher section 63 or the data from the encode section 66 based on a selector control signal according to the input by a user and outputs the selected data.

The output data of the selector 64 are supplied to a recording control section 71 via a CGMS-D rewriting section 67 and a electronic watermarking information WM rewriting section 68. The output data of the selector 64 are supplied also to a CGMS-D decode section 69 and a WM decode section 70, and their CGMS information and electronic watermarking information are extracted and discriminated in the similar manner to that in the CGMS-D decode section 47 and the WM decode section 48 of the set top box mentioned before. Then, the discriminated outputs of the CGMS-D information and the electronic watermarking information are supplied to a control section 60.

The control section 60 judges as to whether or not the input information can be recorded (copied) based on the discriminated outputs of the CGMS-D information and the electronic watermarking information. When the judgment is made that the input information can be recorded (copied), a judgment is made as to whether or not it is necessary to rewrite the CGMS-D information and the electronic watermarking information for copy control.

When the judgment is made that the recording is forbidden, the control section 60 controls the recording control section 71 so that the recording is not executed.

In addition, when the judgment is made that recording is possible or one copy is possible, the control section 60 controls the recording control section 71 so as to execute the recording. The recorded data are subjected to a specific scramble by a scramble section 72 and are recorded onto the RAM disk 100. Moreover, when the judgment is made that one copy is possible, the CGMS information and the electronic watermarking information are rewritten respectively by the rewriting sections 67 and 68.

In this case, since the CGMS information is 2 bit data in a specified position in a data stream from the decipher section 63, the CGMS rewriting section 67 extracts the 2 bit data and rewrites the CGMS information from [10] state into [11] state.

Figure 10:
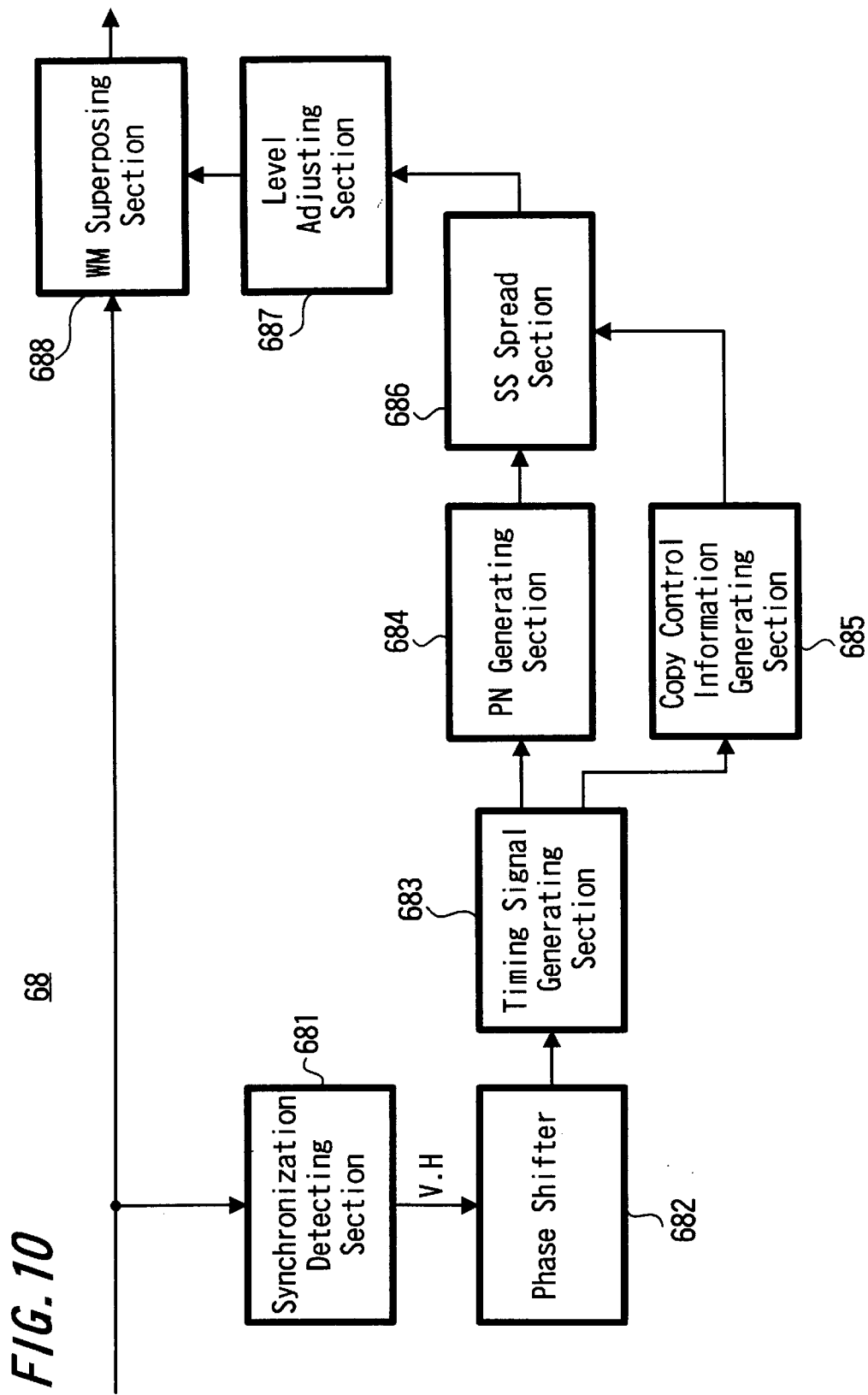
FIG. 10 is a block diagram for explaining a WM rewriting section 68 of the information signal recording device shown in FIG. 9.

Meanwhile, as mentioned above, the electronic watermarking information WM rewriting section 68 uses spectrum spread so that a new spectrum spread signal is superposed. FIG. 10 shows a constitutional example of the electronic watermarking information WM rewriting section 68 in this case. This constitution is approximately similar to the WM forming section 3 of the information signal output device shown in FIG. 1 except a phase shifter 682.

Namely, a synchronization detecting section 681, a timing signal generating section 683, a PN generating section 684, a copy control information generating section 685, an SS spread section 686 and a level adjusting section 687 shown in FIG. 10 correspond respectively to the synchronization detecting section 31, the timing signal generating section 32, the PN generating section 33, the copy control information generating section 34, the SS spread section 35 and the level adjusting section 36, and they have the same constitutions. Moreover, a WM superposing section 688 is constituted similarly to the WM superposing section 2 shown in FIG. 1.

In the information signal recording device of the present embodiment, the phase shifter 682 provided between the synchronization detecting section 681 and the timing signal generating section 683 shifts phases of a vertical synchronization timing signal V and a horizontal synchronization timing signal H detected in the synchronization detecting section 681 by a ½ frame amount so that a signal VR and a signal HR are formed.

Namely, as for the vertical synchronization timing signal V (see FIG. 11(A)) detected by the synchronization detecting section 681, its phase is shifted by the ½ frame amount by the phase shifter 682 as shown in FIG. 11(B) so that the signal VR is formed. Moreover, in this example, the phase of the horizontal synchronization timing signal H is also shifted by the ½ frame amount similarly to the vertical synchronization timing signal V so that the signal HR is formed.

The timing signal generating section 683 uses the signal VR and the signal HR, which were formed by shifting the phases of the vertical synchronization timing signal V and the horizontal synchronization timing signal H by the ½ frame amount, as reference signals and generates a rest signal RE, an enable signal EN, a clock signal PNCLK and another timing signals in the similar manner to the timing signal generating section 32 of the information signal output device and the timing signal generating section 482 of the set top box.

Namely, the timing signal generating section 683 is constituted similarly to the timing signal generating section 32 of the above-mentioned information signal output device. For this reason, the timing signal generating section 683 of the compliant recording device is regarded as having the same constitution as that of the timing signal generating section 32 shown in FIG. 2, and thus the description thereof will be given by using the same reference numerals.

The PN generation timing signal generating section 321 generates a reset signal RE of ½ frame period as shown in FIG. 11(D) by using the signal VR (see FIG. 11(B)), which was formed by shifting the vertical synchronization timing signals V (see FIG. 11(A)) by the ½ frame, and the signal HR (see FIG. 11(C)), which was formed by shifting the horizontal synchronization timing signals H by the ½ frame similar to the vertical synchronization signal V, as reference signals.

Further, the PN generation timing signal generating section 321 generates an enable signal EN by using the signal VH (see FIG. 11(B)) and the signal HR (see FIG. 11(C)) as reference signals. In this example, the enable signal EN is generated as a signal for generating a PN code from the PN generating section 684 at every other ½ frame (see FIG. 11(E)). Namely, as shown in FIG. 11(E), the enable signal EN is a signal where a low-level signal interval and a high-level signal interval are repeated alternatively at every ½ frame. The enable signal EN is low active.

The PN clock generating section 322 generates a PN clock PNCLK (see FIG. 11(F)) which is synchronized with the signal HR by using a PLL. Moreover, the timing signal generating section 323 generates various timing signals to be used in the information signal output device in FIG. 1 based on the signals VR and the signal HR.

The reset signal RE, the enable signal EN and the PN clock signal PNCLK, which were generated in the timing signal generating section 683, are supplied to the PN generating section 684.

The PN generating section 684 is constituted similarly to the PN code generating section 32 of the information signal output device. The PN generating section 684 generates a PN code string PS for spectrum spreading copy control information in the second area in the latter half portion of each frame of an image signal according to the reset signal RE, the enable signal EN and the clock signal PNCLK.

Namely, the PN generating section 684 is reset with a ½ frame period by the reset signal RE in this example. Only when being brought into a PN code generation possible state (enable state) by the enable signal EN, the PN generating section 684 generates the PN code string PS according to the clock signal PNCLK.

As a result, the PN generating section 684 of the compliant recording device generates the PN code string PS with the ½ frame period in the second area of each frame of an image signal as shown in FIG. 11(G). The PN code string PS, which was obtained by the PN generating section 684 in such-a manner, is supplied to the SS spread section 686.

Meanwhile, the copy control information generating section 685 generates copy control information, which is additional information to be newly superposed on an image signal recorded onto the RAM disk 100, based on the clock PNCLK at the timing of the enable signal EN from the timing signal generating section 683, and outputs the copy control information based on the clock PNCLK so as to supply it to the SS spread section 686. Namely, the copy control information generating section 685 forms a copy control information string FS at the timing same as that of the PN code string PS so as to supply the copy control information string to the SS spread section 686.

In the case where an image signal to be recorded onto the RAM disk 100 can be copied once, the copy control information generating section 685 generates copy control information representing "No More Copy" state based on the control signal from the control section 60. Therefore, the copy control information generating section 685 generates copy control information representing "No More Copy" state.

The SS spread section 686 spectrum spreads the copy control information string FS from the copy control information generating section 685 by using the PN code string PS from the PN generating section 684 so as to form a spectrum spread signal.

As mentioned with reference to FIG. 11, the PN code string PS and the copy control information string FS are generated in the second area or the latter half portion of each frame of the image signal based on the timing signal from the timing signal generating section 683.

The spectrum spread signal from the SS spread section 686 is supplied to the WM superposing section 688 via the level adjusting section 687. The level adjusting section 687 adjusts a superposing level so that a reproduced image is not deteriorated due to superposing of the spectrum spread signal.

The spectrum spread signal whose level was adjusted is superposed on the second area of each frame of the image signal by the WM superposing section 688.

Figure 12A:
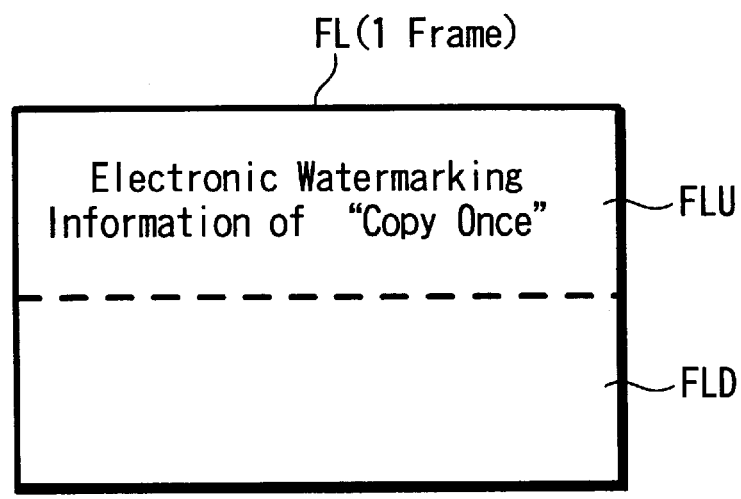
FIG. 12 is a diagram for explaining rewriting of electronic watermarking information WM in the WM rewriting section 68 shown in FIG. 9.

As a result, as shown in FIG. 12A, the spectrum spread signal representing "Copy Once" is superposed on a first area FLU of each frame FL of the image signal supplied to the compliant recording device. When the spectrum spread signal is not superposed on a second area FLD, the image signal is judged as being a signal which can be copied once.

Figure 12B:
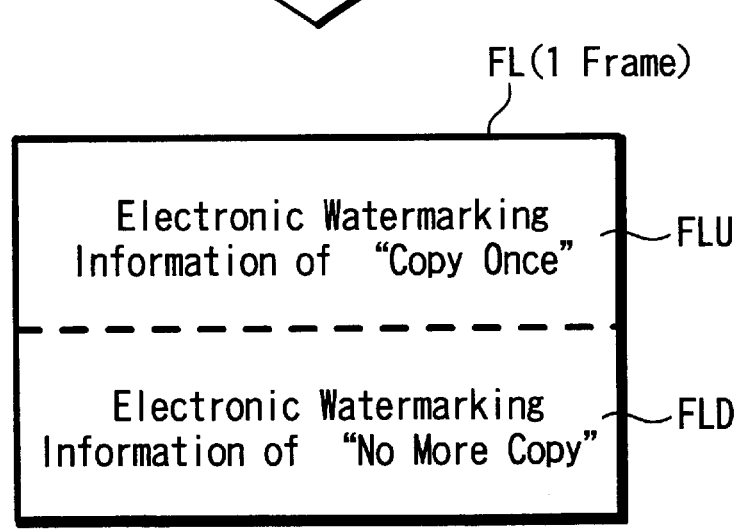

As shown in FIG. 12B, the spectrum spread signal representing "No More Copy" is superposed on the second area FLD of each frame FL as mentioned above, and the spectrum spread signal representing "Copy once" is superposed on the first area FLU. The image signal where the spectrum spread signal representing "No More Copy" was superposed on the second area FLD is recorded on the RAM disk 100.

As mentioned above, in the case where the spectrum spread signal representing "Copy Once" is superposed on the first area FLU of each frame FL of the image signal and the image signal which can be copied once is recorded onto the RAM disk, the spectrum spread signal representing "No More Copy" is superposed on the second area FLD.

In this case, the spectrum spread signal representing "Copy Once" and the spectrum spread signal representing "No More Copy" are not superposed on the same area of the image signal. For this reason, even if the spectrum spread signal representing "Copy Once" as well as the spectrum spread signal "No More Copy" is superposed on the same image signal, deterioration of the reproduced image due to the superposing of the spectrum spread signal can be prevented.

As mentioned as to the WM decode 48 of the set top box, when both the spectrum spread signal superposed on the first area FLU of each frame FL of the image signal and the spectrum spread signal superposed on the second area FLD are detected, a judgment positively is made as to whether the image signal can be copied or cannot be copied, and the copy control and the copy generation limit control can be made suitably.

[Modified Example 1]

In the above-mentioned embodiment, in the recording device of the compliant and set top box, a judgment is made as to whether or not an image signal can be recorded based on the spectrum spread signals which are superposed respectively on the first area FLU and the second area FLD of each frame FL of the supplied image signal.

However, as mentioned below, by monitoring only the spectrum spread signal on the second area, the judgment is made accurately as to whether or not the supplied image signal can be copied, and reproduction control and recording control can be made.

In the above-mentioned embodiment, in the information signal output device shown in FIG. 1, even if an image signal to be outputted is prevented from being copied from the beginning, can be copied freely or can be copied once, the copy control information representing its copy control is spectrum spread and is superposed on the first frame FLU of each frame FL of the image signal, and the spectrum spread signal is not superposed on the second area FLD.

Therefore, in this example, in the case where the image signal to be outputted is prevented from being copied from the beginning and can be copied freely, the spectrum spread signals representing the same copy control state are superposed respectively on the first area FLU and the second area FLD of each frame of the image signal.

Figure 13A:
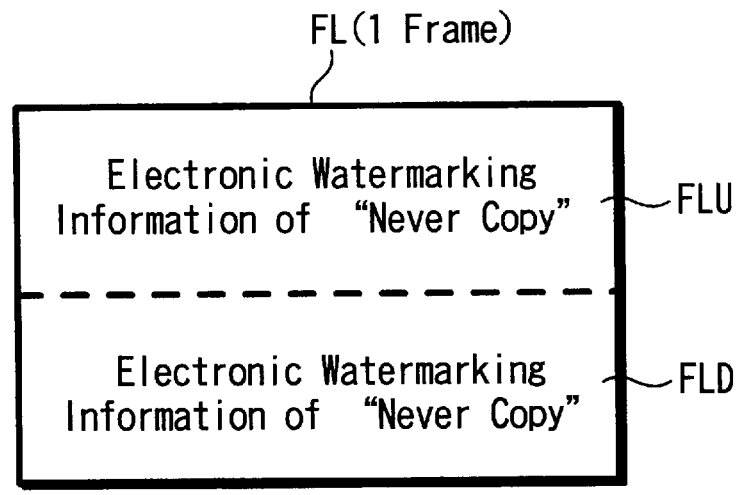
FIG. 13 is a diagram for explaining another example of the superposing method of the electronic watermarking information WM.

Namely, in the case where the image signal to be outputted is prevented from being copied from the beginning, as shown in FIG. 13A, the spectrum spread signal representing "Never Copy" is superposed on both the first area FLU and the second area FLD of each frame of the image signal.

Figure 13B:
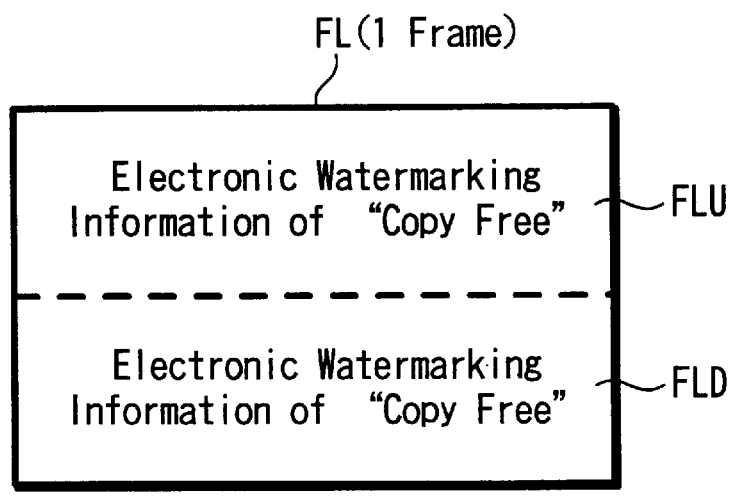

In addition, in the case where the image signal to be outputted can be coped freely, as shown in FIG. 13B, the spectrum spread signal representing "Copy Free" is superposed on both the first area FLU and the second area FLD of each frame of the image signal.

By the way, in the case where the image signal to be outputted can be copied once, as shown in FIG. 4A, the spectrum spread signal representing "Copy Once" is superposed only on the first area FLU of each frame of the image signal.

In the case where the image signal can be copied once and it is recorded on the RAM disk, in the recording device of the compliant, the spectrum spread signal representing "No More Copy" is superposed on the second area FLD of each frame of the image signal as mentioned above.

Therefore, when the spectrum spread signal is not superposed on the second area of each frame FL of the image signal, the image signal can be copied once. In the case where the spectrum spread signal representing "No More Copy" is superposed on the second area, the image signal can be judged as an image signal which is prevented from being copied further.

In addition, in the case where the spectrum spread signal representing "Never Copy" is superposed on the second area FLD of each frame FL of the image signal, the image signal is prevented from being copied from the beginning. In the case where the spectrum spread signal representing "Copy Free" is superposed on the second area FLD of each frame FL of the image signal, the image signal can be judged as an image signal which can be copied freely.

As described above, in the case of the image signal which is forbidden to be copied from the beginning, the spectrum spread signal representing "Never Copy" is superposed also on the second area FLD of each frame FL. In the case of the image signal which can be copied freely, the spectrum spread signal representing "Copy Free" is superposed also on the second area FLD of each frame FL. As a result, by monitoring only the second area of each frame of the image signal, a judgment is made accurately as to whether the image signal is forbidden to be copied or can be copied, and thus suitable reproduction control and recording control can be carried out.

In both the recording devices of the compliant and the set top box, the judgment can be made by monitoring only the second area as to the copy control state of the image signal.

Figure 8:
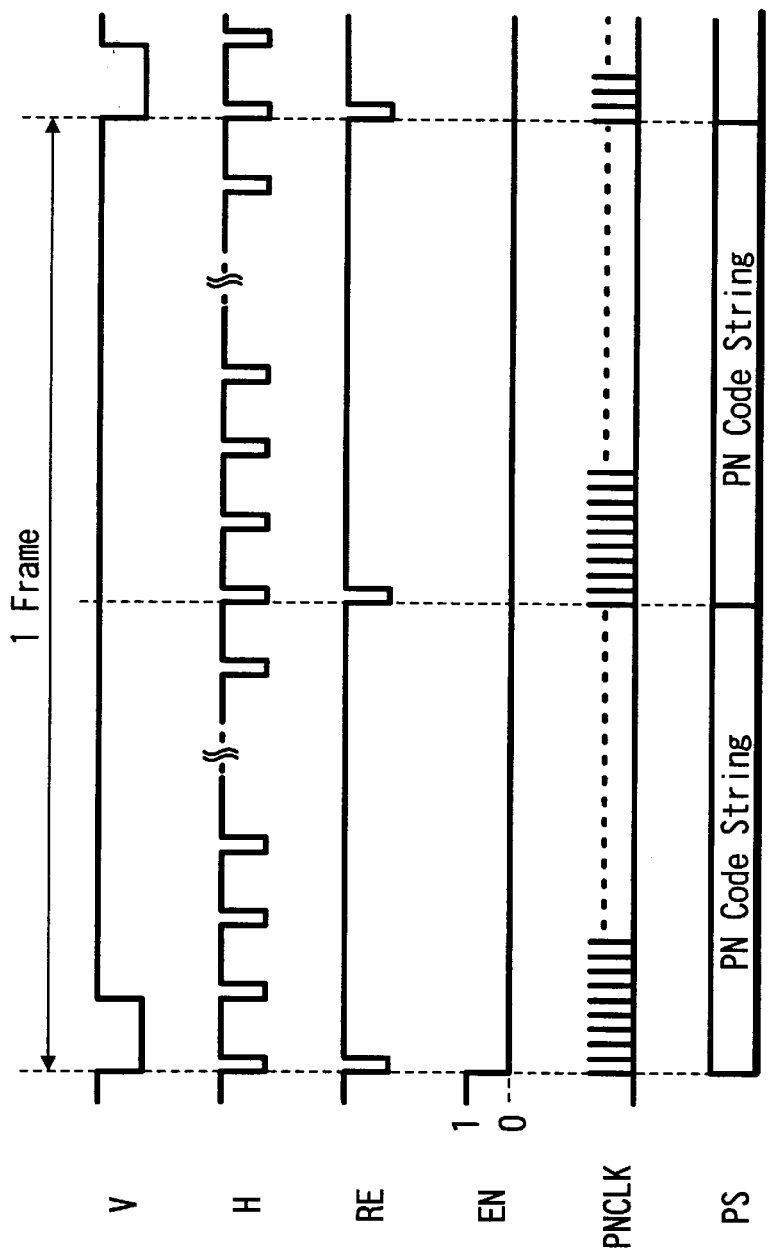
FIG. 8 is a diagram for explaining various timing signals generated in the timing signal generating section 48 shown in FIG. 7 and an inverse spread-use PN code string generated by using the timing signals.

Here, in the case where the spectrum spread signal is superposed on both the first area FLU and the second area FLD of each frame of the image signal, as shown in FIG. 8, for example, the reset signal RE of ½ frame period, the enable signal EN which brings the PN generating section and the copy control information generating section into the operable state in each frame, and the clock signal PNCLK are generated based on the vertical synchronization timing signal V and the horizontal synchronization timing signal H.

Then, the same copy control information string FS and the same PN code string PS are generated in the first area and the second area of each frame by using the timing signals, and the strings are multiplied so that the spectrum spread signal is formed and is superposed on the image signal.

FIG. 8 explains the timing signal used in a case where a spectrum spread signal, which is superposed on the first area FLU and the second area FLD of each frame FL of the image signal, is detected. By using the same timing signal shown in FIG. 8, a spectrum spread signal representing the same copy control state can be generated and superposed on the first area FLU and the second area FLD of each frame FL of the image signal.

In addition, in the case where the spectrum spread signal is detected only from the second area of each frame of the image signal, the PN code string PS is generated only in the second area of each frame FL by using the reset signal RE, the enable signal EN and the clock signal PNCLK shown in FIG. 11, and the PN code string PS is used as the spread code for inverse spread so as to be spread inversely. As a result, copy control information which is spectrum spread and is superposed on the second area FLD of each frame FL of the image signal can be detected.

MODIFIED EXAMPLE 2

In addition, in the above-mentioned set top box, in the case where a digital image signal is outputted via the IEEE1394 digital interface 50, when the output destination is the recording device of the compliant, an image signal which can be copied once or an image signal which can be copied freely is outputted only.

Namely, in the case of an image signal which is forbidden to be copied from the beginning or an image signal which has been already copied once and in which the spectrum spread signal representing "No More Copy" is superposed on the second area FLD of each frame FL, the set top box does not output the digital image signal to the recording device of the compliant.

Therefore, in this case, in the compliant recording device, in the case where the digital image signal which is outputted via the digital interface 50 of the set top box is recorded onto the RAM disk 100, only by monitoring the first area FLU of each frame of the image signal, the copy control of the image signal can be made suitably.

Namely, in the case where the spectrum spread signal representing "Copy Once" is superposed on the first area of each frame FL of a supplied image signal, a judgment is made that the image signal can be copied once. This is because even if the image signal can be copied once, the image signal, which has been already copied once and in which the spectrum spread signal representing "No More Copy" is superposed on the second area of each frame FL, is not supplied from the set top box.

In this case, as described with reference to FIGS. 9 and 10, the compliant recording device superposes the spectrum spread signal representing "No More Copy" on the second area of each frame FL of the image signal, and records the image signal onto the RAM disk 100.

In addition, in the case where the spectrum spread signal representing "Copy Free" was superposed on the first area of each frame FL of the supplied image signal, the image signal is judged as a signal which can be copied freely, and the image signal is recorded onto the RAM disk 100.

In the compliant recording device which receives an image signal via the IEEE1394 digital interface, as for a digital image signal supplied via the digital interface, the copy control of the supplied image signal can be made by monitoring only the spectrum spread signal on the first area of each frame FL.

In the aforementioned embodiment, digital broadcasting broadcasted via the information signal output device (broadcasting device) is received by the set top box, and an image signal from the set top box is recorded by the recording device. However, the supply of an information signal is not limited to broadcasting media. For example, the invention can be applied to a case that an information signal such as an image signal or the like is supplied via a disk medium such as a ROM disk or the like.

Namely, the information signal output device of the present invention can be applied to a so-called authoring device for recording an information signal such as an image signal or the like onto a recording medium. Namely, the output processing section 8 of the information signal output device as a broadcasting device shown in FIG. 1 is replaced by a recording processing section for forming an image signal to be recorded onto a recording medium from a supplied image signal so as to record it onto the recording medium so that so-called the authoring device can be constituted.

In addition, the information signal output device of the present invention can be applied also to a reproducing device for reproducing an information signal as an image signal or the -like recorded on a recording medium so as to output it. Namely, in the set top box shown in FIG. 6, instead of the channel select section 41 and the demultiplex section 43, a reading section for reading the information signal from the recording medium is provided so that the information signal reproducing device can be constituted.

In the reproducing device for reading the image signal from the recording medium so as to reproduce it and the like, a disk on which the image signal is recorded is a RAM disk, and the spectrum spread signal representing "Copy Once" state is superposed on the first area FLU of each frame of the image signal recorded on the RAM disk. Even in the case where a spectrum spread signal is not superposed on the second area FLD, when the recording medium on which the image signal is recorded is a RAM disk, a judgment is made that the image signal is copied once onto the RAM disk, and thus reproduction and output can be stopped.

Namely, a media type of a recording medium recorded onto a header of the recording medium and an TOC (table of contents), namely, a read-only recording medium, a rewritable recording medium and the like are taken into consideration so that reproduction and output can be limited.

In addition, the information signal output device of the present invention can be applied also to a information processing device such as a personal computer having a communication function which is capable of transmitting and receiving data via communication media such as internet or the like.

In the aforementioned embodiment, the first half portion (first ½ frame) of each frame of an image signal is determined as the first area and a latter half portion (latter ½ frame) is determined as the second area, and the first area and the second area are provided in a spatial direction of the image signal. However, the present invention is not limited to this. For example, one frame is divided into a plurality of areas, and the first area and the second area are provided in separated areas.

In addition, one field is divided into two so that the first area and the second area are set, or one field is divided into a plurality of areas so that the first area and the second area can be provided in separated areas.

Figure 14A:
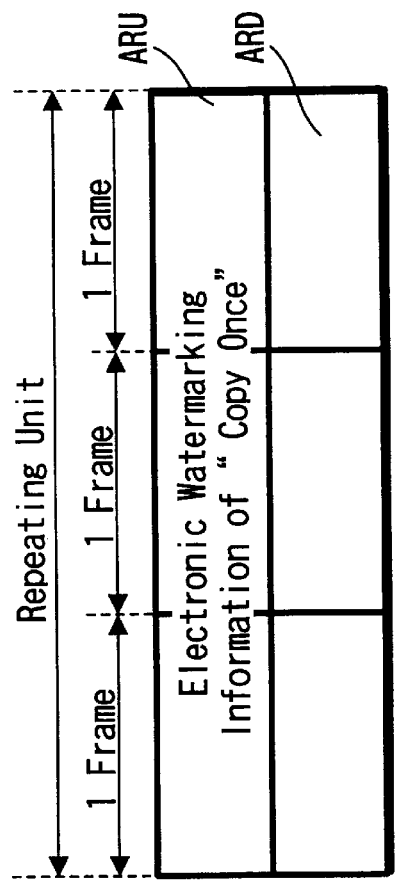
FIG. 14 is a diagram for explaining another example of the superposing method of the electronic watermarking information WM.
Figure 14B:
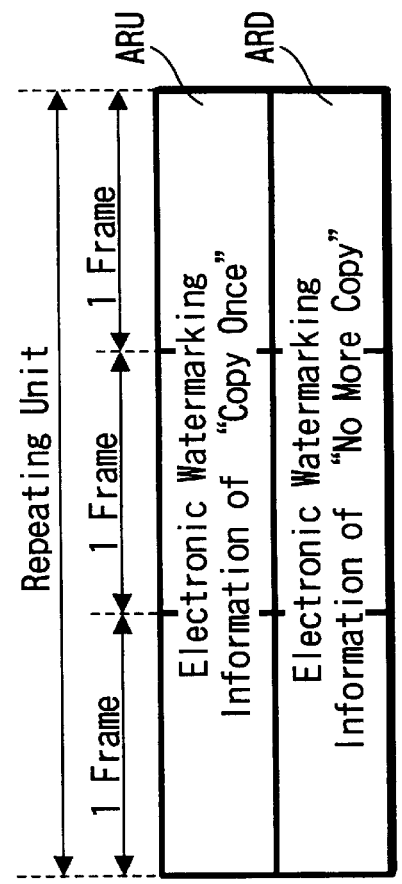

In addition, as shown in FIG. 14, the first area FLU and the second area FLD are not provided in one frame, and the first half portion of the plural frames is set as a first area ARU and the latter half portion of the plural frames is set as a second area ARD so that the first area ARU onto which the spectrum spread signal is superposed and the second area ARD may be provided in a spatial direction of an image signal.

Figures 15A, 15B:
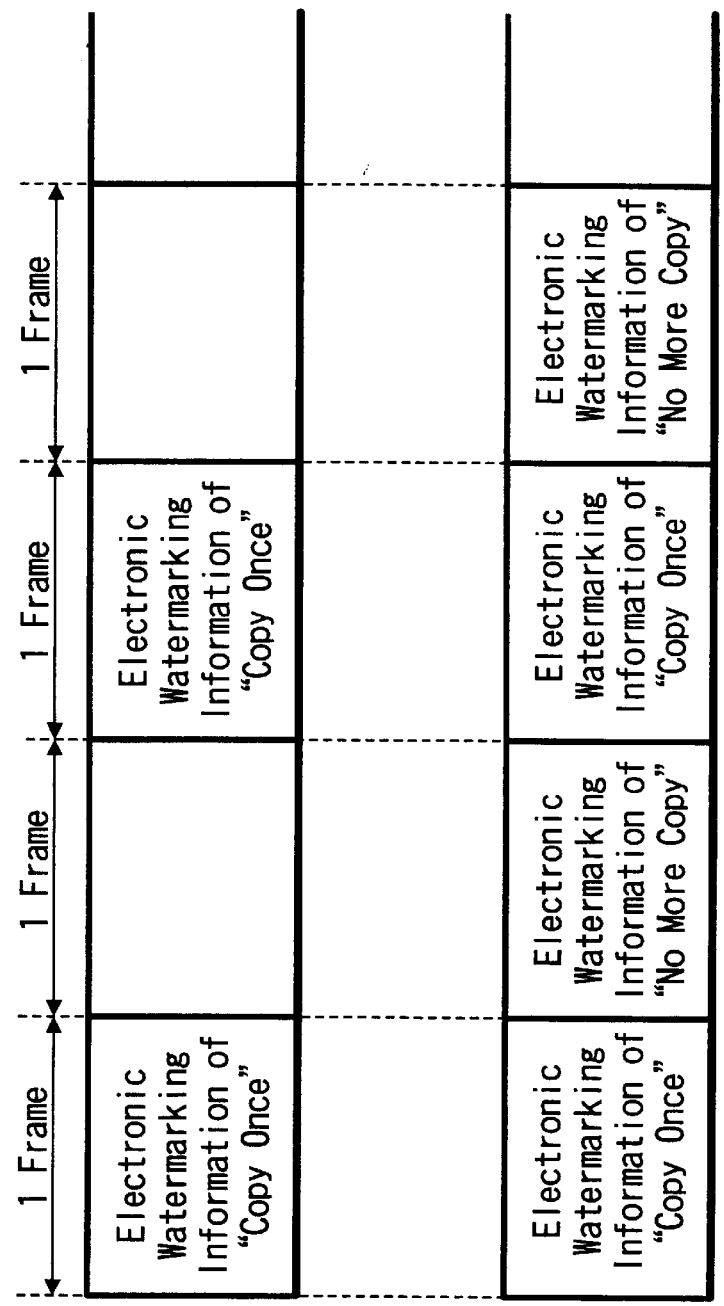
FIG. 15 is a diagram for explaining another example of the superposing method of the electronic watermarking information WM.

In addition, as shown in FIG. 15, the first frame is set as the first area and the next frame is set as the second area so that the first area and the second area can be provided in a time direction.

In addition, needless to say, the first area and the second area may be provided in separate positions at every other 1 frame or at every several plural frames.

The first area and the second area can be formed and set so that the reset signal and enable signal EN generated in the timing signal generating section agree with the objective areas.

In addition, the aforementioned embodiment described that the spectrum spread signal superposed on the first area FLU of the image signal and the spectrum spread signal superposed on the second area FLD are formed by using the same PN code string, but the present invention is not limited to this spectrum spread signals, which are formed by spectrum spread using different PN code strings, can be superposed respectively on the first area and the second area of an image signal.

In addition, the aforementioned embodiment described that the information signal is an image signal, but the information signal is not limited to the image signal. The present invention can be applied to various information signals.

Such as a sound signal, computer data and the like.

In the case where the information signal is other than an image signal, the first area and the second area may be set alternatively at a predetermined time on the basis of time, or the first area and the second area may be set alternatively at a predetermined data amount on the basis of a data amount of the information signal.

In the case where the information signal is other than an image signal, the vertical synchronization timing signal and the horizontal synchronization timing signal cannot be used like an image signal. For this reason, electronic watermarking information for detecting electronic watermarking information (electronic watermarking information for synchronization) is superposed between the first area and the second area or on heads of the first and second areas, or a predetermined spectrum spread signal is superposed on heads or ends of the spectrum spread signal to be superposed on the first and second areas. As a result, the spectrum spread signals superposed on the first and second areas can be detected.

In addition, in the present embodiment, information signals supplied to the recording device, such as the digital signal outputted from the information signal output device, the digital image signal outputted from the set top box and the like, undergoes CSS system encryption process. However, the encryption process is not limited to the CSS system, and thus another encryption processes using various systems can be used.

In addition, copy information other than the electronic watermarking information is not limited to CGMS information (in the case of a digital signal, CDMS-D), and thus various copy control information which can control generation limit can be used.

In addition, in the aforementioned embodiment, the PN code is used as the spread code, but the spread code is not limited to the PN code. Needless to say, the spectrum spread may be executed by using another spread code.

In addition, a spread code such as the PN code string or the like can be superposed as the spectrum spread signal on the information signal such as the image signal by using a superposing/non-superposing pattern which is predetermined according to copy control information or an inversion/non-inversion pattern. In this case, copy control contents can be transmitted by the superposing/non-superposing pattern or the inversion/non-inversion pattern of the spectrum superposed signal superposed on the information signal.

In addition, the electronic watermarking information is not limited to the spectrum spread system according to the aforementioned embodiment. For example, additional information may be superposed on a digital signal in a very low level, or when data is compressed by using orthogonal transformation such as MPEG compression or the like, additional information of very low level may be superposed on a component which was transformed into a frequency axis so as not to be noticed as a noise.

In addition, the first additional information and the second additional information superposed as the electronic watermarking information on the image signal are not limited to the copy control information. For example, various information, such as copyright information, plural times limit information of copy, information about a supply source equipment on the first area or information about a recording device which executed copying, is superposed on the first and second areas and is used as electronic watermarking information.

In addition, the rewritable recording medium is not limited to a disk recording medium, but may be a semiconductor storage device.

As mentioned above, according to the invention of claim 1, different two pieces of information are superposed on one information signal, and they can be extracted respectively so that the information signal can be transmitted. Moreover, since the two different pieces of information are not superposed on one area of the information signal, deterioration of the information signal, which is caused by superposing of additional information, cannot be made to be worse.

In addition, according to the invention of claim 2, a copy generation of an information signal can be limited suitably based on information before copy generation limit which is added to the first area of an information signal and information after copy generation limit which is added to the second area.

In addition, according to the invention of claim 3, the first area and the second area are determined in a time direction of the information signal, and the first additional information is superposed on the first area and the second additional information is superposed on the second area so that the information signal can be transmitted.

In addition, according to the invention of claim 4, the first area and the second area are determined based on a data amount of an information signal, and the first additional information is superposed on the first area and the second additional information is superposed on the second area so that the information signal can be transmitted.

In addition, according to the invention of claim 5, the first area and the second area are determined by using a frame of an image signal as a unit, and the first additional information is superposed on the first area and the second additional information is superposed on the second area so that the image signal can be transmitted.

In addition, according to the invention of claim 6, the first area and the second area are determined in a spatial direction of an image signal, and the first additional information is superposed on the first area and the second additional information is superposed on the second area so that the image signal can be transmitted.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A method of superposing second additional information on an information signal, comprising the steps of:
   a first step of generating first and second electronic watermarking information corresponding to first and second additional information; and
   a step of superposing said first electronic watermarking information on a first area of an information signal and superposing said second additional electronic watermarking information on a second area of said information signal;
   wherein the first additional information and the second additional information are information for limiting a copy generation of said information signal; and
   wherein the first additional information represents a state before the copy generation is limited, and the second additional information represents a state after the copy generation is limited.

2. The additional information superposing method according to claim 1, characterized in that said first area and the second area are set as areas at every predetermined time length of said information signal.

3. The additional information superposing method according to claim 1, characterized in that said first area and the second area are set as areas at every predetermined data amount of said information signal.

4. The additional information superposing method according to claim 1, characterized in that:
   said information signal is an image signal; and
   said first area and said second area are formed in a time direction by using a frame or field as a unit.

5. The additional information superposing method according to claim 1, characterized in that:
   said information signal is an image signal; and
   said first area and said second area are formed separately within one frame or one field.

6. An information signal copy control method for an information signal on which additional information is added, comprising steps of:
   a step of detecting electronic watermarking information superposed on a first area of an information signal and corresponding to a first additional information;
   a step of judging whether or not second electronic watermarking information corresponding to second additional information is superposed on a second area of the information signal based on detected electronic watermarking information corresponding to said first additional information; and
   a step of superposing second electronic watermarking information on a second area of said information signal based on a judged result;
   wherein the first additional information and the second additional information are information for limiting a copy generation of said information signal; and
   wherein the first additional information represents a state before the copy generation is limited, and the second additional information represents a state after the copy generation is limited.

7. An information signal copy control method for an information signal having first and second areas to which first and second additional information are respectively added, comprising the steps of:
   a step of detecting electronic watermarking information superposed on a second area of an information signal corresponding to a second additional information;
   a step of judging whether or not first electronic watermarking information corresponding to a second information signal is superposed on a second area of said information signal based on electronic watermarking information corresponding to said second additional information detected; and
   a step of superposing second electronic watermarking information on the second area of said information signal again based on a judged result;
   wherein the first additional information and the second additional information are information for limiting a copy generation of said information signal; and
   wherein the first additional information represents a state before the copy generation is limited, and the second additional information represents a state after the copy generation is limited.

8. An information signal copy control method for an information signal added with additional information, comprising the steps of:
   a step of detecting electronic watermarking information corresponding to first additional information superposed on a first area of an information signal and electronic watermarking information corresponding to second additional information superposed on a second area of said information signal; and a step of controlling recording of said information signal based on the first and second electronic watermarking information corresponding to said first and second additional information detected, and superposing electronic watermarking information corresponding to second additional information on said second area again;

wherein the first additional information and the second additional information are information for limiting a copy generation of said information signal; and wherein the first additional information represents a state before the copy generation is limited, and the second additional information represents a state after the copy generation is limited.

9. The information signal copy control method according to claim 6, characterized in that said first area and said second area are set as areas at every predetermined time length of said information signal.

10. The information signal copy control method according to claim 6, characterized in that said first area and said second area are set as areas at every predetermined data amount of said information signal.

11. The information signal copy control method according to claim 6, characterized in that:

said information signal is an image signal; and said first area and said second area are formed in a time direction by using a frame or field as unit.

12. The information signal copy control method according to claim 6, characterized in that:

said information signal is an image signal; and said first area and said second area are formed separately within one frame or one field.

13. An information signal output device for outputting an information signal which is divided into a first area and a second area and where first additional information comprising electronic watermarking information is superposed on said first area and second additional information comprising electronic watermarking information is superposed on said second area, said information signal output device being characterized by comprising:

a second additional information detecting means for detecting the second additional information superposed on said second area; and an output control means for controlling an output of said information signal based on a detected output from said second additional information detecting means;

wherein the first additional information and the second additional information are information for limiting a copy generation of said information signal; and wherein the first additional information represents a state before the copy generation is limited, and the second additional information represents a state after the copy generation is limited.

14. An information signal output device for outputting an information signal which is divided into a first area and a second area and where first additional information comprising electronic watermarking information is superposed on said first area and second additional information comprising electronic watermarking information is superposed on said second area, said information signal output device being characterized by comprising:

a first additional information detecting means for detecting said first additional information superposed on said first area;

a second additional information detecting means for detecting said second additional information superposed on said second area; and an output control means for controlling an output of said information signal based on a detected output from said first additional information detecting means and a detected output from said second additional information detecting means;

wherein the first additional information and the second additional information are information for limiting a copy generation of said information signal; and wherein the first additional information represents a state before the copy generation is limited, and the second additional information represents a state after the copy generation is limited.

15. The information signal output device according to claim 13, characterized in that said first area and said second area are set as areas at every predetermined time length of said information signal.

16. The information signal output device according to claim 13, characterized in that said first area and said second area are set as areas at every predetermined data amount of said information signal.

17. The information signal output device according to claim 13, characterized in that:

said information signal is an image signal; and said first area and said second area are formed in a time direction by using a frame or field as a unit.

18. The information signal output device according to claim 13, characterized in that said first area and said second area are formed separately within one frame or one field.

19. An information signal recording device for recording an information signal which is divided into a first area and a second area and where first additional information comprising electronic watermarking information is superposed on said first area and second additional information comprising electronic watermarking information is superposed on said second area, said recording device characterized by comprising:

a digital interface for being provided with said information signal;

a first additional information detecting means for detecting additional information superposed on said first area of said information signal provided via said digital interface;

a recording control means for controlling recording of said information signal based on a detected output from said first additional information detecting means; and a superposing means for, when said information signal is to be recorded on a recording medium by said recording control means, forming the second additional information if necessary so as to superpose it on said second area;

wherein the first additional information and the second additional information are information for limiting a copy generation of said information signal; and wherein the first additional information represents a state before the copy generation is limited, and the second additional information represents a state after the copy generation is limited.

20. An information signal recording device for recording an information signal which is divided into a first area and a second area and where first additional information comprising electronic watermarking information is superposed on said first area and second additional information comprising electronic watermarking information is superposed on said second area, said information signal recording device characterized by comprising:

a second additional information detecting means for detecting additional information superposed on said second area of said information signal;

a recording control means for controlling recording of said information signal based on a detected output from said second additional information detecting means; and a superposing means for, when said information signal is to be recorded on a recording medium by said recording control means, forming the second additional information if necessary so as to superpose it on said second area;

wherein the first additional information and the second additional information are information for limiting a copy generation of said information signal; and wherein the first additional information represents a state before the copy generation is limited, and the second additional information represents a state after the copy generation is limited.

21. An information signal recording device for recording an information signal which is divided into a first area and a second area and where first additional information comprising electronic watermarking information is superposed on said first area and second additional information comprising electronic watermarking information is superposed on said second area, said information signal recording device characterized by comprising:

a first additional information detecting means for detecting additional information superposed on said first area of said information signal;

a second additional information detecting means for detecting additional information superposed on said second area of said information signal;

a recording control means for controlling recording of said information signal based on a detected output from said first additional information detecting means and a detected output from said second additional information detecting means; and a superposing means for, when said information signal is recorded on a recording medium by said recording control means, forming the second additional information if necessary so as to superpose it on said second area.

22. The information signal recording device according to claim 19, characterized in that said first area and said second area are set as areas at every predetermined time length of said information signal.

23. The information signal recording device according to claim 19, characterized in that said first area and said second area are set as areas at every predetermined data amount of said information signal.

24. The information signal recording device according to claim 19, characterized in that:

said information signal is an image signal; and said first area and said second area are formed in a time direction by using a frame or field as a unit.

25. The information signal recording device according to claim 19, characterized in that:

said information signal is an image signal; and said first area and said second area are formed separately within one frame or one field.

* * * * *